(12) United States Patent
Bellert

(10) Patent No.: US 11,393,236 B2
(45) Date of Patent: Jul. 19, 2022

(54) APPROXIMATING THE LAYOUT OF A PAPER DOCUMENT

(71) Applicant: Konica Minolta Business Solutions U.S.A., Inc., San Mateo, CA (US)

(72) Inventor: Darrell Eugene Bellert, Boulder, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 379 days.

(21) Appl. No.: 16/746,520

(22) Filed: Jan. 17, 2020

(65) Prior Publication Data

US 2021/0224532 A1 Jul. 22, 2021

(51) Int. Cl.
*G06K 9/00* (2022.01)
*G06V 30/414* (2022.01)
*G06F 40/58* (2020.01)
*G06T 11/20* (2006.01)
*G06F 17/18* (2006.01)
*G06V 30/148* (2022.01)
*G06V 30/10* (2022.01)

(52) U.S. Cl.
CPC .......... *G06V 30/414* (2022.01); *G06F 17/18* (2013.01); *G06F 40/58* (2020.01); *G06T 11/20* (2013.01); *G06V 30/153* (2022.01); *G06T 2210/12* (2013.01); *G06V 30/10* (2022.01)

(58) Field of Classification Search
CPC .............. G06K 9/00463; G06K 9/344; G06K 2209/01; G06F 40/58; G06F 17/18; G06F 40/106; G06T 11/20; G06T 2210/12
See application file for complete search history.

(56) References Cited

U.S. PATENT DOCUMENTS

| 7,272,258 | B2* | 9/2007 | Berkner | G06T 11/60 382/176 |
| 2004/0145593 | A1* | 7/2004 | Berkner | G06F 16/9577 345/619 |
| 2004/0146199 | A1* | 7/2004 | Berkner | G06F 16/9577 382/176 |
| 2005/0076290 | A1* | 4/2005 | Balinsky | G06F 40/103 715/267 |
| 2006/0204094 | A1* | 9/2006 | Koyama | G06F 40/58 382/176 |
| 2007/0208996 | A1* | 9/2007 | Berkner | G06F 40/106 706/19 |
| 2008/0300858 | A1* | 12/2008 | Konno | G06F 40/103 704/4 |

(Continued)

*Primary Examiner* — Avinash Yentrapati
(74) *Attorney, Agent, or Firm* — Osha Bergman Watanabe & Burton LLP

(57) ABSTRACT

An image processing method to generate a layout of searchable content from a physical document. The method includes generating extracted content blocks in the physical document, generating, based on a bounding box of a text block, a layout rectangle that identifies where machine-encoded text is placed in the layout of the searchable content, generating, based on a bounding box of a non-text block, an avoidance region that identifies where the machine-encoded text is prohibited in the layout of the searchable content, generating, based on the layout rectangle and the avoidance region, a draft layout of the searchable content, and iteratively adjusting a point size of the machine-encoded text in the draft layout to generate the layout of the searchable content.

20 Claims, 20 Drawing Sheets

(56) References Cited

U.S. PATENT DOCUMENTS

| | | | | |
|---|---|---|---|---|
| 2009/0210215 A1* | 8/2009 | Konno | ................... | G06F 40/58 |
| | | | | 382/229 |
| 2013/0298013 A1* | 11/2013 | Hunter | ................. | G06F 40/137 |
| | | | | 715/243 |
| 2014/0053050 A1* | 2/2014 | Yano | ...................... | G06T 11/60 |
| | | | | 715/202 |

* cited by examiner

APPROXIMATING THE LAYOUT OF A PAPER DOCUMENT

BACKGROUND

Document scanners and camera devices are able to capture images of physical documents that include typed, handwritten, and/or printed text in combination with non-text objects such as pictures, line drawings, charts, etc. Images of these physical documents are not computer-searchable using a text string entered into a search input. However, optical character recognition (OCR) and handwriting recognition are techniques that are able to convert these images into computer-searchable electronic documents. In particular, OCR and handwriting recognition techniques are used to extract searchable content from these images to construct the computer-searchable electronic documents.

SUMMARY

In general, in one aspect, the invention relates to an image processing method to generate a layout of searchable content from a physical document. The method includes generating, by a computer processor and based on an image of the physical document, a plurality of extracted content blocks in the physical document, wherein the plurality of the extracted content blocks comprises a text block and a non-text block, the text block comprising machine-encoded text to form the searchable content, generating, by the computer processor and based at least on a first bounding box of the text block, a layout rectangle that identifies where the machine-encoded text is placed in the layout of the searchable content, generating, by the computer processor and based at least on a second bounding box of the non-text block, an avoidance region that identifies where the machine-encoded text is prohibited in the layout of the searchable content, generating, by the computer processor and based at least on the layout rectangle and the avoidance region, a draft layout of the searchable content, and iteratively adjusting, by the computer processor and based on a predetermined criterion, a point size of the machine-encoded text in the draft layout to generate the layout of the searchable content.

In general, in one aspect, the invention relates to a system for processing an image to generate a layout of searchable content from a physical document. The system includes a memory, and a computer processor connected to the memory and that generates, based on an image of the physical document, a plurality of extracted content blocks in the physical document, wherein the plurality of the extracted content blocks comprises a text block and a non-text block, the text block comprising machine-encoded text to form the searchable content, generates, based at least on a first bounding box of the text block, a layout rectangle that identifies where the machine-encoded text is placed in the layout of the searchable content, generates, based at least on a second bounding box of the non-text block, an avoidance region that identifies where the machine-encoded text is prohibited in the layout of the searchable content, generates, based at least on the layout rectangle and the avoidance region, a draft layout of the searchable content, and iteratively adjusts, based on a predetermined criterion, a point size of the machine-encoded text in the draft layout to generate the layout of the searchable content.

In general, in one aspect, the invention relates to a non-transitory computer readable medium (CRM) storing computer readable program code for processing an image to generate a layout of searchable content from a physical document. The computer readable program code, when executed by a computer, includes functionality for generating, based on an image of the physical document, a plurality of extracted content blocks in the physical document, wherein the plurality of the extracted content blocks comprises a text block and a non-text block, the text block comprising machine-encoded text to form the searchable content, generating, based at least on a first bounding box of the text block, a layout rectangle that identifies where the machine-encoded text is placed in the layout of the searchable content, generating, based at least on a second bounding box of the non-text block, an avoidance region that identifies where the machine-encoded text is prohibited in the layout of the searchable content, generating, based at least on the layout rectangle and the avoidance region, a draft layout of the searchable content, and iteratively adjusting, based on a predetermined criterion, a point size of the machine-encoded text in the draft layout to generate the layout of the searchable content.

Other aspects of the invention will be apparent from the following description and the appended claims.

DETAILED DESCRIPTION

Figure 1:
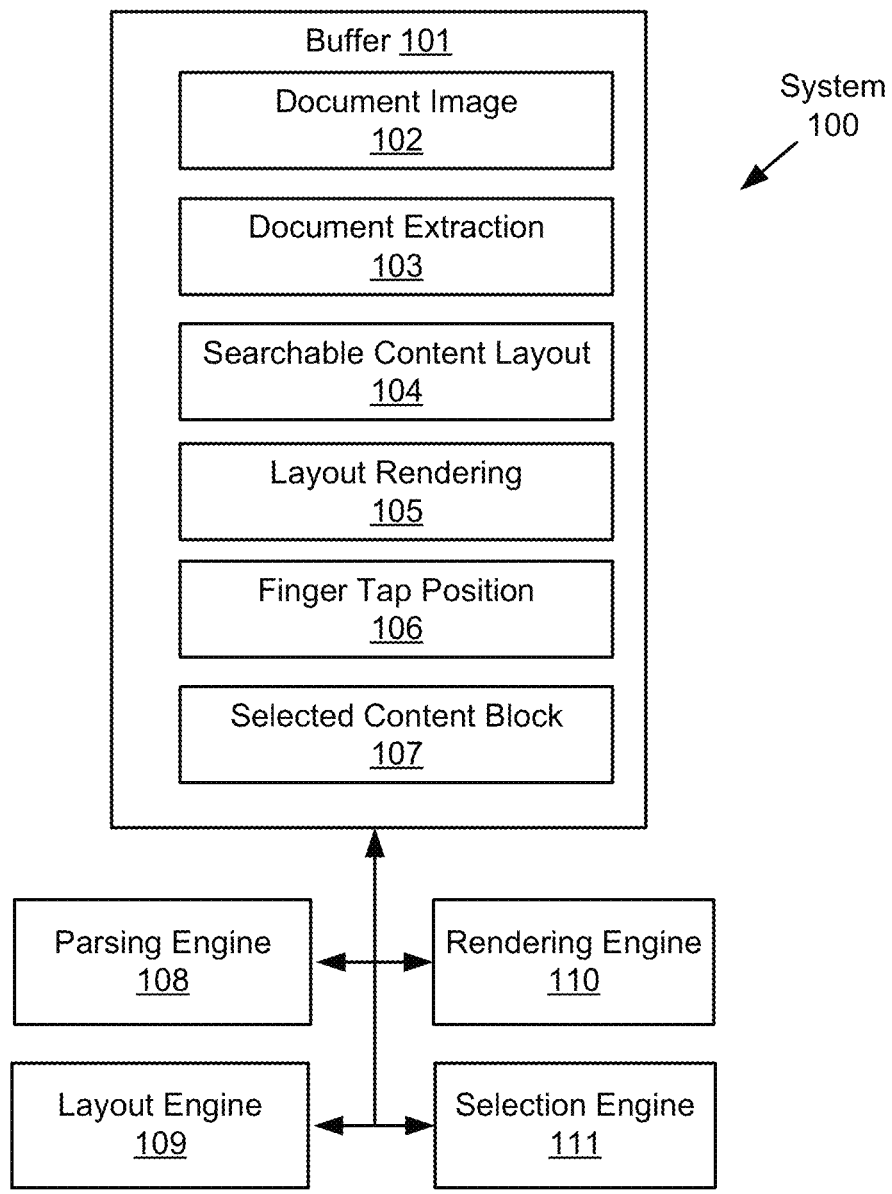
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, non-transitory computer readable medium, and system to approximate content of a physical document in electronic form. In particular, a layout of searchable content extracted from the physical document is generated where the generated layout approximates an original layout of the physical document. Further, embodiments of the invention provide a user application environment where content on the physical document is selected for performing a document processing task. For example, the selected content may be highlighted, modified, and/or copied into a separate electronic document.

In an example implementation of one or more embodiments, an image of a physical document is captured and cropped to the document borders. The document contents are extracted from the image, including identification of text via OCR/handwriting recognition along with other document contents such as tables, non-text images, vector drawings, charts, etc. A rendered version of the physical document is displayed for the user to select any extracted text. In one or more embodiments, text in the rendered version of the physical document may be translated into a different language before being displayed to a user.

FIG. 1 shows a system (100) in accordance with one or more embodiments of the invention. As shown in FIG. 1, the system (100) has multiple components, including, for example, a buffer (101), a parsing engine (108), a layout engine (109), a rendering engine (110), and a selection engine (111). Each of these components (101, 108, 109, 110, 111) may be located on the same computing device (e.g., personal computer (PC), laptop, tablet PC, smart phone, multifunction printer, kiosk, server, etc.) or on different computing devices connected by a network of any size having wired and/or wireless segments. In one or more embodiments, these components may be implemented using the computing system (600) described below in reference to FIG. 6. Each of these components is discussed below.

In one or more embodiments, the buffer (101) may be implemented in hardware (i.e., circuitry), software, or any combination thereof. The buffer (101) is configured to store a document image (102), which is an image of a physical document. The document image (102) may be captured using a camera device or a document scanner. In this context, the physical document is referred to as the original physical document. The physical document includes one or more lines of text made up of characters that are handwritten, typed, and/or printed. The physical document may also include non-text objects such as pictures and graphics.

The document image (102) may be a part of a collection of document images that are processed by the system (100) to generate intermediate and final results. Further, the document image (102) may be of any size and in any image format (e.g., BMP, JPEG, TIFF, PNG, etc.). Specifically, the image format of the document image (102) does not store or otherwise include any machine-encoded text.

The buffer (101) is further configured to store the intermediate and final results of the system (100) that are directly or indirectly derived from the document image (102). The intermediate and final results include a document extraction (103), a searchable content layout (104), a layout rendering (105), a finger tap position (106), and a selected content block (107), which are described in more detail below.

In one or more embodiments of the invention, the parsing engine (108) may be implemented in hardware (i.e., circuitry), software, or any combination thereof. The parsing engine (108) parses the document image (102) to extract content and layout information of characters and other content blocks in the document image (102). The parsing engine (108) uses the extracted content and layout information to generate the document extraction (103), which is a computer-searchable version of the document image (102). In particular, the content of the characters is extracted using OCR or other character recognition techniques and stored in the document extraction (103) as machine-encoded text. The machine-encoded text in the document extraction (103) may be based on the original language of the typed, handwritten, and/or printed text on the physical documents.

Alternatively, the parsing engine (108) may translate, in response to a user request or based on a preset configuration, the OCR output into a translated version of the document extraction (103). The translated version includes machine-encoded text in a different language compared to the original language of the typed, handwritten, and/or printed text on the physical documents.

Whether translation is performed or not, the layout of the extracted characters and other content blocks are identified and stored in the document extraction (103) as corresponding bounding boxes. Based on the machine-encoded text and bounding boxes, the document extraction (103) contains searchable content of the physical document from which the document image (102) is captured.

In one or more embodiments, the document extraction (103) is in a predetermined format that is encoded with extracted information from the document image (102). This predetermined format stores the extracted information as extracted content blocks corresponding to the text and non-text portions of the original physical document. The extracted content block is a portion of the extracted information that corresponds to a contiguous region on the physical document. Each extracted content block is stored in the predetermined format with a bounding box that represents the outline and location of the contiguous region. In one or embodiments, the bounding boxes are specified using a device independent scale such as millimeters or inches. Alternatively, the bounding boxes are specified using a device dependent scale such as pixel counts in the document image (102).

The extracted content blocks include one or more text blocks and one or more non-text blocks. The text block is an extracted content block that includes only a string of machine-encoded text, such as one or more paragraphs, lines, and/or runs of text. The non-text block is an extracted content block that includes non-text content, such as a picture, a line drawing, a chart, or other types of non-text objects. The text block may be considered as including nested content blocks in that the paragraph is at a higher level than a line within the paragraph, the line is at a higher level than a word within the line, and the word is at a higher level than a character within the word.

Additionally, some non-text blocks are superimposed with a text block and are considered as including nested content blocks. For example, a table that includes texts will include nested content blocks. More specifically, a table is a non-text block having cells defined by a line drawing where a cell in the table includes a string of machine-encoded text. A chart having a line drawing annotated with machine encoded text is another example of nested content blocks. In particular, the table or the chart is at the top level of the nested content blocks while the machine-encoded text is at a lower level of the nested content blocks.

Examples of physical documents and the document extraction (103) are described below in reference to FIGS. 3A-3E, 4A-4B, and TABLE 1.

In one or more embodiments, the layout engine (109) may be implemented in hardware (i.e., circuitry), software, or any combination thereof. The layout engine (109) generates the searchable content layout (104) from the document extraction (103). The layout engine (109) generates the searchable content layout (104) in an iterative manner by adjusting the point size of text. The searchable content layout (104) corresponds to a draft layout during the iterations until the draft layout is finalized and becomes the final layout. The searchable content layout (104) may be in any format that specifies geometric layout information of each extracted content block in the document extraction (103). The geometric layout information includes the location and point size of machine-encoded text placed in the searchable content layout (104).

As the layout engine (109) adjusts the point size, the machine-encoded text is allowed to flow in the searchable content layout (104) and is considered as non-static content. Other non-text content blocks stay in the same location in the searchable content layout (104) independent of point size and are considered as static content.

In one or more embodiments, the format of the searchable content layout (104) is separate from that of the document extraction (103) where the geometric layout information of the searchable content layout (104) references corresponding extracted content blocks in the document extraction (103). Alternatively, the format of the searchable content layout (104) is an extension of the document extraction (103) where the geometric layout information is embedded with corresponding extracted content blocks.

In one or more embodiments, the searchable content layout (104) is specified using a device independent scale such as millimeters or inches. Alternatively, the searchable content layout (104) is specified in a device dependent scale such as pixel counts in the document image (102).

In one or more embodiments, the layout engine (109) performs the functions described above using the method described below in reference to FIG. 2A. An example of the layout engine (109) generating the searchable content layout (104) is described below in reference to FIGS. 4C-4M.

In one or more embodiments, the rendering engine (110) may be implemented in hardware (i.e., circuitry), software, or any combination thereof. The rendering engine (110) generates the layout rendering (105) from the searchable content layout (104). The layout rendering (105) is a synthesized image of that static and non-static content of the searchable content layout (104). The layout rendering (105) may be in any image format (e.g., BMP, JPEG, TIFF, PNG, etc.) to specify the synthesized image.

Furthermore, the layout rendering (105) is formatted such that the synthesized image of the searchable content is suitable to be projected by a projector device onto a workspace surface. The projection of the searchable content on the workspace surface is referred to as a projected document. In one or more embodiments, the projected document approximates the original physical document. In particular, the layout of the searchable content as projected approximates an original layout of the typed, handwritten, and/or printed text. Furthermore, the projected document has a dimension that approximates the paper size of the physical document.

In one or more embodiments, the rendering engine (110) generates the layout rendering (105) as a searchable PDF, which is a separate electronic document from the document extraction (103) and the searchable content layout (104).

In one or more embodiments, the selection engine (111) may be implemented in hardware (i.e., circuitry), software, or any combination thereof. The selection engine (111) generates a selection from the searchable content of the physical document by detecting a finger tap position (106) on a workspace surface. The selection may be a text block, a non-text block, or a content block at any level in one or more nested content blocks. The selection is saved or otherwise referenced in the buffer (101) as the selected content block (107).

The finger tap position (106) is a position specified by a user's finger gesture on the workspace surface. For example, the finger gesture may be a single finger tap on the finger tap position (106), multiple finger taps defining a rectangle having the finger tap position (106) as a corner, a finger swipe with the finger tap position (106) as a starting or ending point, etc. In one or more embodiments, the physical document and the projected document are placed next to one another on the workspace surface. The finger tap position (106) may be a position on either of the physical document or the projected document. Alternatively, the physical document is placed on the workspace surface without the projected document, and the finger tap position (106) is a position on the physical document. Alternatively, the projected document is projected on the workspace surface without the physical document, and the finger tap position (106) is a position on the projected document.

In one or more embodiments, the selected content block (107) is used by an operating system or software application to perform a document processing task of the original physical document. For example, the selected content block (107) may be copied onto a clipboard and pasted into a separate electronic document. The clipboard is a buffer memory maintained by the operating system resident on the system (100) or maintained by a cloud server coupled to the system (100) via a network. In another example, the selected content block (107) may be removed from the document extraction (103) or the searchable content layout (104) to modify the layout rendering (105). The modified layout rendering (105) is then printed or projected as an edited version of the original physical document.

In one or more embodiments, the rendering engine (110) and selection engine (111) perform the functions described above using the method described below in reference to FIG. 2B. An example of the rendering engine (110) and selection engine (111) performing the functionalities described above are described below in reference to FIGS. 3A-3E and 5A-5G.

Although the system (100) is shown as having five components (101, 108, 109, 110, 111), in one or more embodiments of the invention, the system (100) may have more or fewer components. Furthermore, the functions of each component described above may be split across components. Further still, each component (101, 108, 109, 110, 111) may be utilized multiple times to carry out an iterative operation.

Figure 2A:
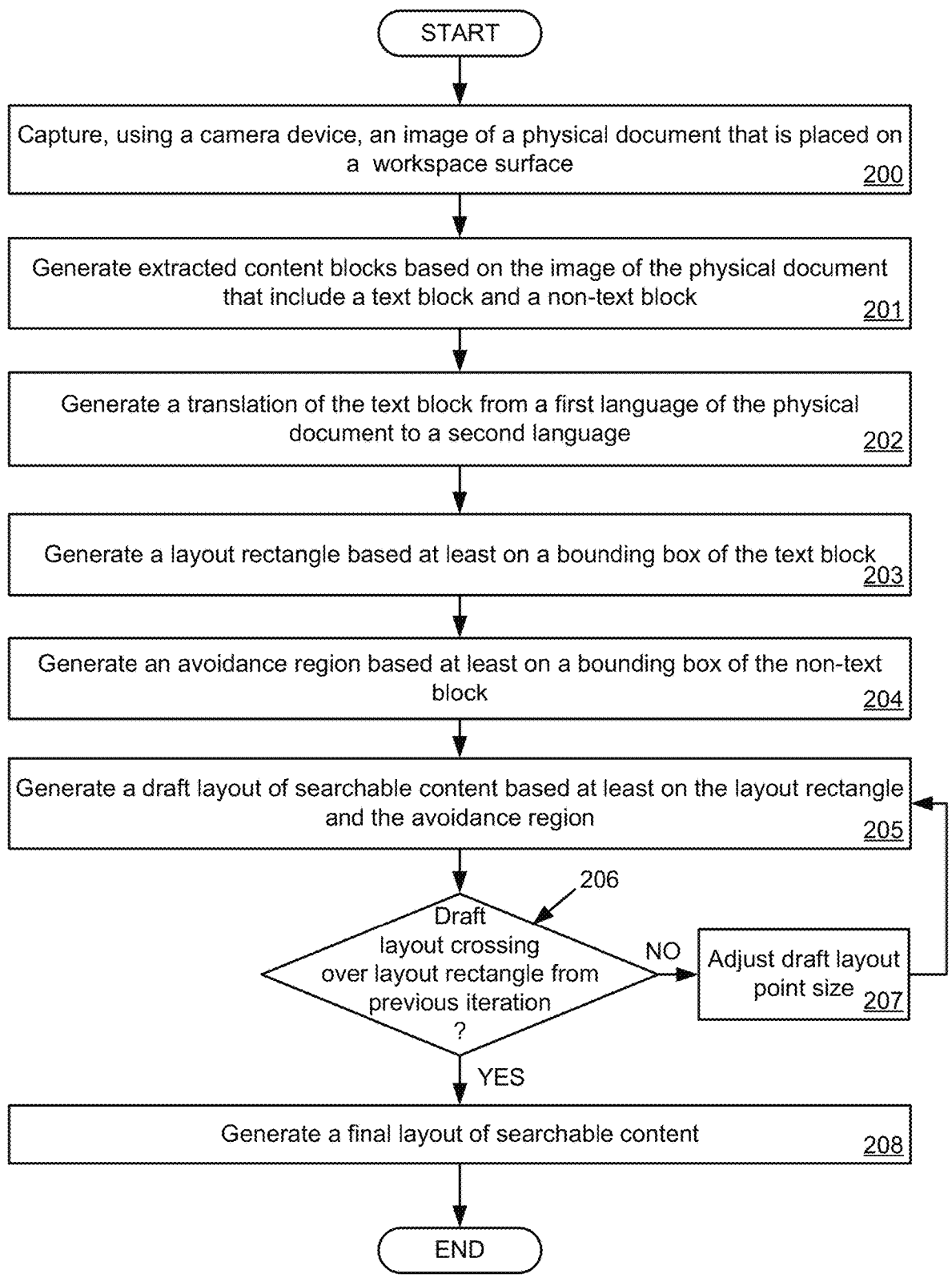
FIGS. 2A-2B show flowcharts in accordance with one or more embodiments of the invention.

FIG. 2A shows a flowchart in accordance with one or more embodiments of the invention. One or more of the steps in FIG. 2A may be performed by the components of the system (100), discussed above in reference to FIG. 1. In one or more embodiments, one or more of the steps shown in FIG. 2A may be omitted, repeated, and/or performed in a different order than the order shown in FIG. 2A. Accordingly, the scope of the invention should not be considered limited to the specific arrangement of steps shown in FIG. 2A.

Referring to FIG. 2A, initially in Step 200, according to one or more embodiments, the image of the physical document is captured using a camera device. Alternatively, the image of the physical document may also be captured using a document scanner. In one or more embodiments, the physical document is a single paged document placed on a workspace surface as a single sheet of paper.

In Step 201, extracted content blocks in the physical document are generated using a computer processor based on the image of the physical document. For example, the extracted content blocks may be generated using the parsing engine described above in reference to FIG. 1 above. The extracted content blocks include at least one text block and one non-text block. In particular, the text block includes machine-encoded text extracted using OCR or other character recognition techniques to form searchable content. In one or more embodiments, the extracted contents may include only text blocks or only non-text blocks.

In Step 202, a translation of the machine-encoded text from the original language of the physical document (herein referred to as "the first language") to a different language (herein referred to as "the second language") is generated by the computer processor. For example, the translation may be generated using the parsing engine described above in reference to FIG. 1. In one or more embodiments, the bounding box of the text block and a resultant layout rectangle are based on the image of the physical document in the first language while the draft layout and the layout of the searchable content are based on the second language.

In Step 203, the layout rectangle is generated by the computer processor based at least on a bounding box of the text block. The layout rectangle identifies where the machine-encoded text of the text block is to be placed in the layout of the searchable content.

In Step 204, an avoidance region is generated by the computer processor based at least on a bounding box of the non-text block. The avoidance region identifies where the machine-encoded text is prohibited in the layout of the searchable content.

In Step 205, a draft layout of the searchable content is generated by the computer processor based at least on the layout rectangle and the avoidance region. To generate the draft layout, paragraph statistics of the text block are generated. Based on the paragraph statistics, each paragraph of the text block is placed in the draft layout in reference to the layout rectangle and the avoidance region. The point size of machine-encoded text in the paragraphs is initially set based on a seed point size and subsequently adjusted for each iteration of executing Step 205. For example, the seed point size may be set as a small point size such that the draft layout is iteratively enlarged by increasing the point size before a final layout is generated. In another example, the seed point size may be set as a large point size such that the draft layout is iteratively reduced in size by reducing the point size before the final layout is generated.

In Step 206, a determination is made whether the draft layout crosses over a boundary of the layout rectangle from a previous draft layout. The cross over is a condition where a boundary (e.g., the bottom boundary) of the layout rectangle falls between corresponding edges (e.g., bottom edges) of the current draft layout and the previous draft layout. If the determination is positive, i.e., the draft layout crosses over a boundary of the layout rectangle from a previous draft layout, the method proceeds to Step 208. If the determination is negative, i.e., the draft layout does not cross over any boundaries of the layout rectangle from any previous draft layouts, the method proceeds to Step 207.

In Step 207, the point size of the machine-encoded text in the paragraphs is adjusted by a predetermined amount. For the example where the draft layout is increased in size from the previous draft layout to check for the cross over condition in Step 206, the point size is incremented by one or other predetermined amount before returning to Step 205. In another example where the draft layout is decreased in size from the previous draft layout to check for the cross over condition in Step 206, the point size is decremented by one or other predetermined amount before returning to Step 205. For a draft layout generated in a first iteration where a previous draft layout does not exist, the point size is incremented before returning to Step 205 if the draft layout does not exceed any boundaries of the layout rectangle, and decremented before returning to Step 205 if the draft layout exceeds any boundaries of the layout rectangle.

In Step 208, the final layout of the searchable content is generated. If the draft layout in the current iteration crosses over from the previous draft layout by receding into the layout rectangle, the draft layout in the current iteration is selected as the final layout of the searchable content. If the draft layout in the current iteration crosses over from the previous draft layout by exceeding outside of the layout rectangle, the immediate previous draft layout before the current draft layout crosses over the layout rectangle is selected as the final layout of the searchable content. In one or more embodiments, the process of Steps 203 through 208 may be performed using the layout engine described above in reference to FIG. 1.

Figure 2B:
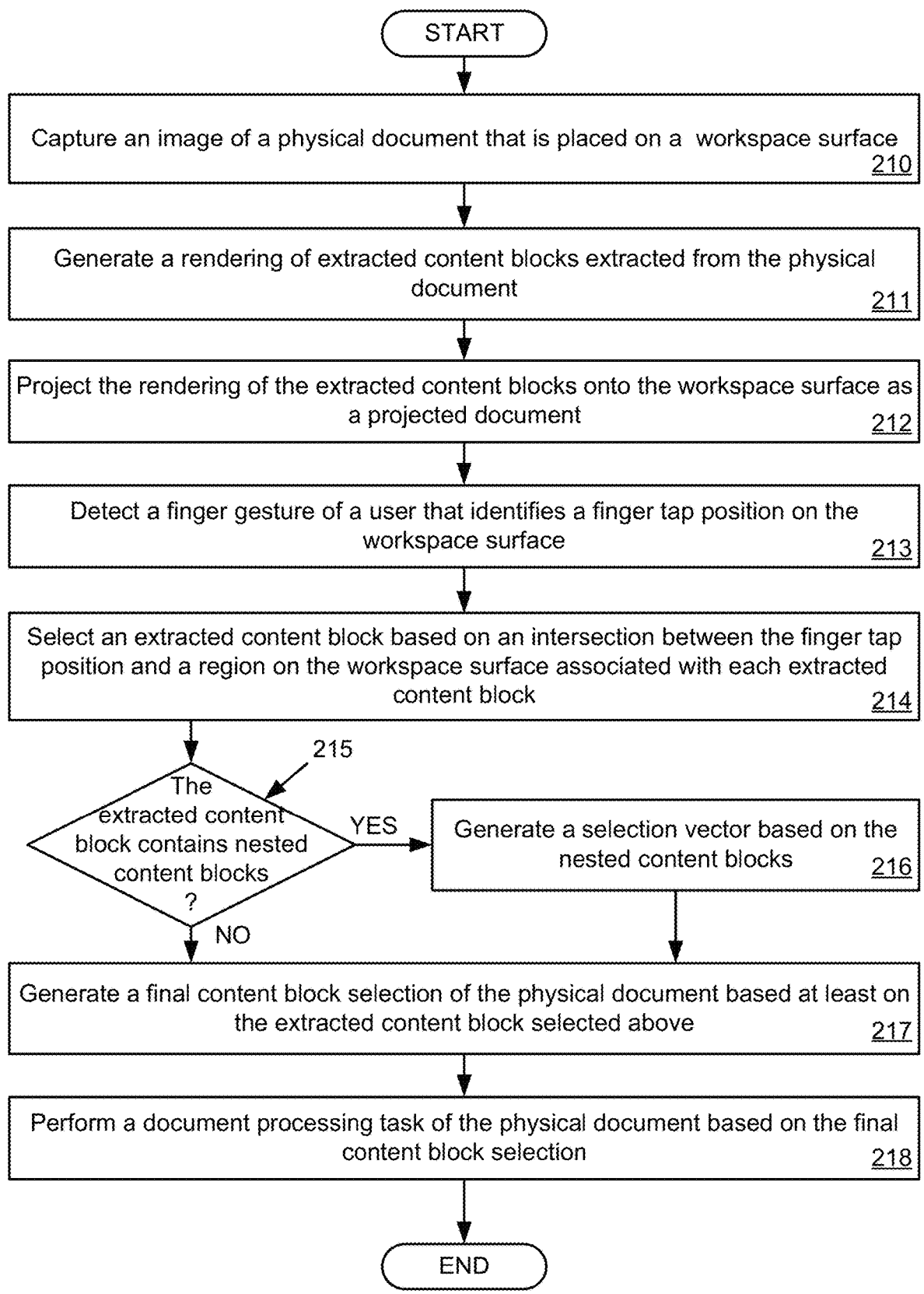

FIG. 2B shows a flowchart in accordance with one or more embodiments of the invention. One or more of the steps in FIG. 2B may be performed by the components of the system (100), discussed above in reference to FIG. 1. In one or more embodiments of the invention, one or more of the steps shown in FIG. 2B may be omitted, repeated, and/or performed in a different order than the order shown in FIG. 2B. Accordingly, the scope of the invention should not be considered limited to the specific arrangement of steps shown in FIG. 2B.

Referring to FIG. 2B, initially in Step 210 according to one or more embodiments, an image of a physical document is captured using a camera device. Alternatively, the image of the physical document may also be captured using a document scanner. Once the capture is complete, extracted content blocks are extracted from the document image to generate a searchable content layout. For example, the extracted content blocks may be generated using the parsing engine described above in reference to FIG. 1. In one or more embodiments, the physical document is a single paged document placed on a workspace surface as a single sheet of paper.

In Step 211, a rendering of the extracted content blocks is generated by a computer processor. For example, the rendering may be generated using the layout engine and the rendering engine described above in reference to FIG. 1.

In Step 212, the rendering of the extracted content blocks is projected onto the workspace surface as a projected document using a projector device. In one or more embodiments, the projected document and the physical document are placed on the workspace surface next to one another. In particular, the rendering of the extracted content blocks is generated and projected in such a way that the projected document and the physical document are substantially identical to one another in size and layout.

In Step 213, a finger gesture of a user is detected using a camera device disposed toward the workspace surface. In particular, the finger gesture identifies a finger tap position on the workspace surface. For example, the finger tap position may be on the physical document or on the projected document on the workspace surface.

In Step 214, one of the extracted content blocks is selected by the computer processor based on an intersection between the finger tap position and a region on the workspace surface associated with each of the extracted content blocks. The extracted content block with the largest area of intersection is selected. In one example where the finger gesture is a single finger tap, a finger tap window on the workspace surface is generated by the computer processor to surround the finger tap position. The area of intersection is the overlap area between the finger tap window and the region on the workspace surface associated with the corresponding extracted content block.

In another example where the finger gesture comprises multiple finger taps, a selection rectangle on the workspace surface is generated by the computer processor. The corners of the selection rectangle are defined by the multiple finger tap positions. In this example, the area of intersection is the overlap area between the selection rectangle and the region on the workspace surface associated with the corresponding extracted content block(s).

In Step 215, a determination is made whether the extracted content block selected above contains nested content blocks. If the determination is positive, i.e., the extracted content block contains nested content blocks, the method proceeds to Step 216. If the determination is negative, i.e., the extracted content block does not contain any nested content blocks, the method proceeds to Step 217.

In Step 216, a selection vector is generated based on the nested content blocks. The nested content blocks are placed in or referenced by the sequence of vector elements of the selection vector according to corresponding nesting levels.

In Step 217, a final content block selection of the physical document is generated based at least on the selected extracted content block. In one example, if no selection vector exists or if the selection vector contains only a single vector element, the extracted content block is the final content block selection. In another example, if the selection vector exists and only a single finger gesture is detected, the top level of the extracted content block is selected by the single finger gesture. In yet another example, if the selection vector exists and a sequence of finger gestures are detected that successively cause the extracted content block to be selected for multiple times, the selection vector is traversed, based on a number of times the extracted content block being successively selected by the sequence of finger gestures, to identify the corresponding vector element. The nested content block stored in or referenced by the identified vector element is selected as the final content block selection of the physical document.

The final content block selection may be highlighted. In the example where the finger tap position is on physical document placed on the workspace surface, a highlight pattern is projected onto the portion of the physical document to identify the final content block selection. In another example where the finger tap position is on the projected document on the workspace surface, a highlight pattern is further projected onto the portion of the projected document to identify the final content block selection.

In Step 218, a document processing task of the physical document is performed based on the final content block selection. For example, the machine-encoded text in the final content block selection may be used in a copy-and-paste or cut-and-pasted operation of an operating system or software application.

FIGS. 3A-3E show an implementation example in accordance with one or more embodiments of the invention. The implementation example shown in FIGS. 3A-3E is based on the system and method flowcharts described in reference to FIGS. 1, 2A and 2B above. In one or more embodiments of the invention, one or more elements shown in FIGS. 3A-3E may be omitted, repeated, and/or organized in a different arrangement. Accordingly, the scope of the invention should not be considered limited to the specific arrangement of elements shown in FIGS. 3A-3E.

Figure 3B:
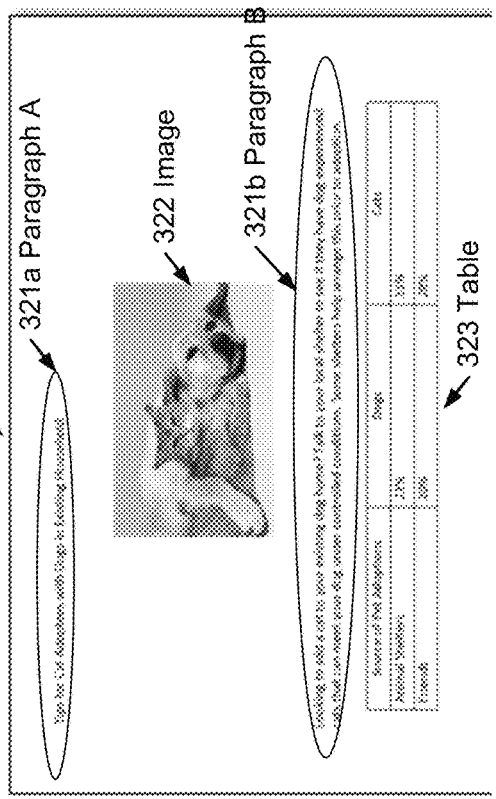
FIGS. 3A-3E show an implementation example in accordance with one or more embodiments of the invention.
Figure 3C:
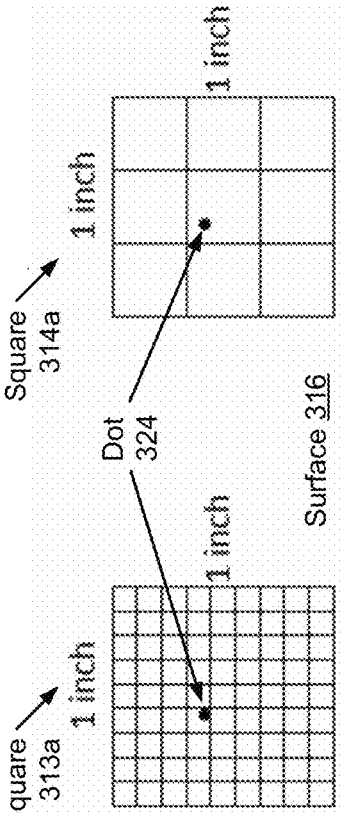
Figure 3A:
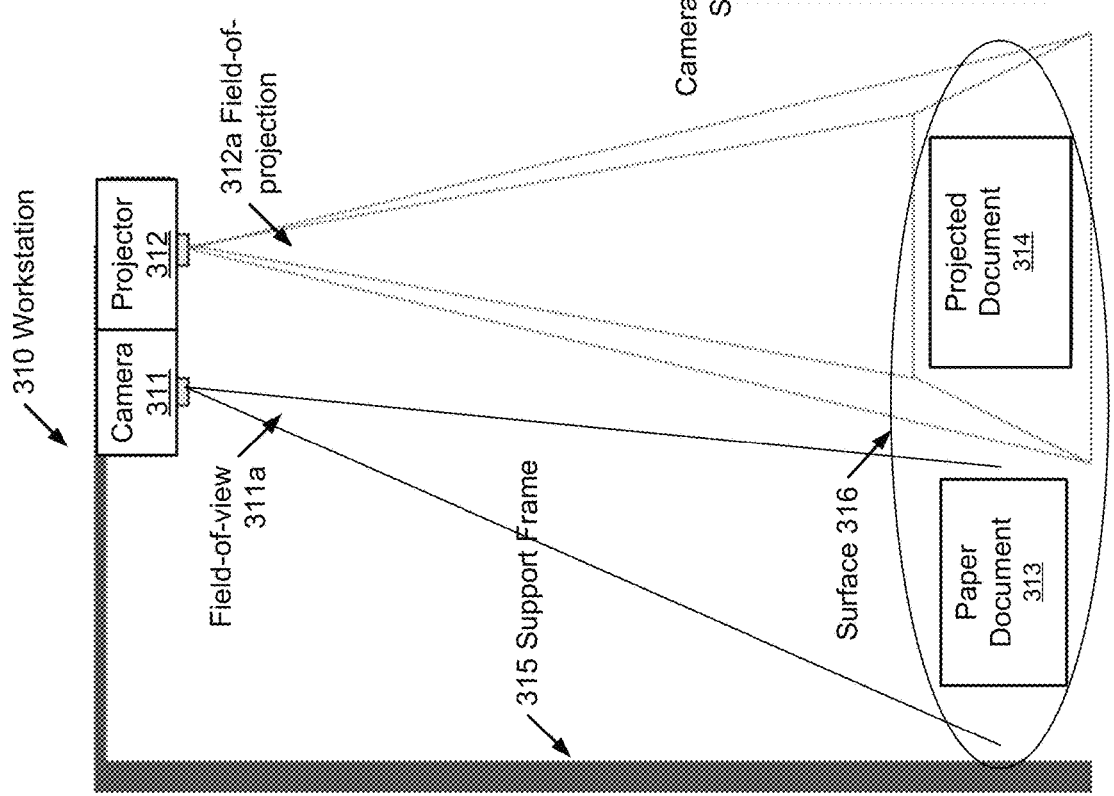

As shown in FIG. 3A, a workstation (310) includes a camera (311) and a projector (312) that are mounted on a support frame (315) and oriented toward a surface (316), which is the workspace surface of the workstation (310). The camera (311) may be any off-the-shelf camera without special optics and/or hardware. The projector (312) may be any off-the-shelf projector without special optics and/or hardware. Alternatively, the camera (311) and/or the projector (312) may be customized devices with special optics and/or hardware. The support frame (315) may be any mechanical structure that could provide stable positioning and orientation of the camera (311) and the projector (312). The surface (316) may be a surface of any type (e.g., a desk, a wall, a whiteboard, and a floor).

Although not explicitly shown in FIG. 3A, the workstation (310) is coupled to the system (100) depicted in FIG. 1 above. In an example configuration, the workstation (310) and the system (100) may be integrated together as a single piece of equipment. In another example configuration, the workstation (310) and the system (100) may be separate from one another and coupled via a direct connection and/or a network connection.

A user may place a paper document (313) on the surface (316) such that the camera (311) captures an image of the paper document (313) within its field-of-view (311a). The field-of-view (311a) is a solid angle within which incoming light beams impinge on an image sensor of the camera (311). The paper document (313) may be a printed document or a hand-written document on any type of media. The camera (311) may be used to capture a preview image with a low resolution (e.g., 60-90 dots per inch (dpi)) and/or a high resolution image (e.g., 600-2400 dpi) of the paper document (313). The preview image may be used by the system (100) to identify a finger tap or other gesture of the user over the surface (316).

The high resolution image may be processed by the system (100) and projected by the projector (312) onto the surface (316) as the projected document (314) within the field-of-projection (312a) of the projector (312). The field-of-projection (312a) is a solid angle within which a light source of the projector (312) projects outgoing light beams. Specifically, the projected document (314) is a projected image that represents the paper document (313). In one example, the projected document (314) may be an image of extracted content blocks from the paper document (313). In another example, the projected document (314) may include a translated version of extracted texts from the paper document (313) in a language different from the language appearing on the physical document. In both examples, the layout and size of the projected document (314) may approximate the layout and size of the paper document (313).

Although not explicitly shown in FIG. 3A, the field of view (311a), which encompasses the paper document (313), and the field of projection (312a), which encompasses the projected document (314) may overlap one another.

In an application scenario, the workstation (310) and the system (100) are used in a projection with interactive capture (PIC) configuration of an Augmented Reality (AR) environment. The PIC configuration includes one or more camera sensors (e.g., an optical sensor and a depth sensor) along with a projector. In a workflow of the PIC configuration (i.e., PIC workflow), the user may interact with various documents that are placed on the surface (316).

For example, the user may translate the text of the paper document (313), create a searchable (non-image based) PDF copy of the original paper document (313) with either original or translated texts, search the paper document (313) for a phrase, or copy content from the paper document (313) and paste the copied content into a separate electronic document. In the PIC workflow, the user may also combine a portion of the paper document (313) with other contents that are created separately from the paper document (313) to generate the final electronic document.

Before launching the PIC workflow, the camera (311) captures a high resolution image of the paper document (313). The captured high resolution image is analyzed by the system (100) to extract various parts of the document as extracted content blocks for storing in a predetermined format, such as JSON, XML, or Google's Protocol Buffers. The extracted content blocks include the document's text blocks (e.g., identified via OCR/ICR and divided into paragraphs, lines, runs, and words), tables, line drawings, figures, charts, images, etc. The document may contain one or more text blocks where each text block is geometrically self-contained and contains one or more paragraphs. Examples of a text block include a header, footer, side bar, or other free standing body of text. Furthermore, bounding boxes and various styling information for the extracted content blocks are also stored in the predetermined format.

FIG. 3B shows an example of the paper document (313) on a single piece of paper that includes multiple paragraphs (e.g., paragraph A (321a), paragraph B (321b)), an image (322), and a table (323). In one or more embodiments, a paragraph may include a single line of or multiple lines of text. An example of the extracted content blocks of the paper document (313) that are stored in the predetermined format is shown in TABLE 1 below. Specifically, TABLE 1 shows an example of the document extraction (103) depicted above in FIG. 1.

TABLE 1

```
units: PIXEL
page {
    num: 1
    size {
        w_v: 2550
        h_v: 3300
    }
    paragraph {
        visible_bbox {
            ulc {
                x_v: 231
                y_v: 134
            }
            size {
                w_v: 989
                h_v: 23
            }
        }
        line {
            visible_bbox {
                ulc {
                    x_v: 231
                    y_v: 134
                }
                size {
                    w_v: 989
                    h_v: 23
                }
            }
            run {
                chars: "Tips for Cat Adoptees with Dogs in Existing Household "
                visible_bbox {
                    ulc {
                        x_v: 231
                        y_v: 134
                    }
                    size {
                        w_v: 989
                        h_v: 23
                    }
                }
                style_id {
                    v: 1
                }
                word {
                    bbox {
                        ulc {
                            x_v: 231
```

TABLE 1-continued

```
                            y_v: 134
                        }
                        size {
                            w_v: 74
                            h_v: 23
                        }
                    }
                    chars: "Tips"
                }
                ...
            }
            ...
        }
        ...
    }
    ...
    table {
        bbox {
            ulc {
                x_v: 271.5
                y_v: 1171
            }
            size {
                w_v: 1995
                y_v: 231
            }
        }
        num_rows: 3
        num_cols: 3
        cell {
            bbox {
                ulc {
                    x_v: 271.5
                    y_v: 1171
                }
                size {
                    w_v: 665
                    y_v: 76
                }
            }
            ri: 0
            ci: 0
            textbox {
                bbox {
                    ulc {
                        x_v: 383
                        y_v: 1184
                    }
                    size {
                        w_v: 458
                        h_v: 34
                    }
                }
                paragraph {
                    visible_bbox {
                        ulc {
                            x_v: 383
                            y_v: 1184
                        }
                        size {
                            w_v: 445
                            h_v: 34
                        }
                    }
                    line {
                        visible_bbox {
                            ulc {
                                x_v: 383
                                y_v: 1184
                            }
                            size {
                                w_v: 445
                                h_v: 34
                            }
                        }
                        run {
                            chars: "Source of Pet Adoptions "
                            visible_bbox {
                                ulc {
                                    x_v: 383
```

TABLE 1-continued

```
                    y_v: 1184
                }
                size {
                    w_v: 445
                    h_v: 34
                }
            }
            word {
                bbox {
                    ulc {
                        x_v: 383
                        y_v: 1187
                    }
                    size {
                        w_v: 123
                        h_v: 25
                    }
                }
                chars: "Source"
            }
            ...
            }
        }
        }
    }
    cell {
    ...
    }
...
}
image {
    meta {
        format: PNG
    }
    data: "...<binary image data>..."
}
}
```

Although TABLE 1 shows a specific format for storing the extracted content blocks of the paper document (313), any other format that stores all the extracted content blocks along with corresponding bounding boxes may also be used. In the example shown in TABLE 1, each of the text block, the image (322), and the table (323) is identified with corresponding bounding box information. Once the extracted content blocks with corresponding bounding boxes are stored in the predetermined format, the aforementioned PIC workflow may be launched.

In the PIC workflow, the extracted content blocks are rendered and projected onto the surface (316) as the projected document (314) adjacent to the paper document (313). The rendering may be based on the original text of the paper document (313) or a translation of the original text. Furthermore, the rendering may be used to generate a searchable (non-image based) PDF copy of either the original or a translated version of the paper document (313). Because image capture by the camera (311) and image projection by the projector (312) may use different discrete units (i.e., pixels), the rendering is based on a method that allows for geometric transformations between the field-of-view (311a) of the camera (311) and the field-of-projection (312a) of the projector (312).

FIG. 3C shows an example of geometric transformations of an imaginary square on the surface (316). Specifically, a 1 inch by 1 inch camera view square (313a) within the paper document (313) is captured by the camera (311) and rendered/projected onto a corresponding 1 inch by 1 inch projector view square (314a) within the projected document (314). In this example, the 1 inch by 1 inch camera view square (313a) corresponds to 81 pixels in the captured image of the paper document (313) while the corresponding 1 inch by 1 inch projector view square (314a) corresponds to 9 pixels of the projected document (314). Accordingly, a dot (324) found on the paper document (313) is represented as coordinates (4, 4) within the camera view square (313a) but represented as coordinates (2, 2) within the projector view square (314a). The mapping from the coordinates (4, 4) within the camera view square (313a) to the coordinates (2, 2) within the projector view square (314a) is part of the geometric transformations.

In addition to mapping based on different pixel resolutions of the camera (311) and the projector (312), additional mappings based on the alignment, offset, and potential image warping (skew) of the camera (311) and the projector (312) may also be included in the geometric transformations when performing rendering in the PIC workflow. For example, the geometric transformations may cross reference corresponding coordinates of the camera view and the projector view based on a physical mark on the workspace surface. Accordingly, the rendering matches the look and feel of the projected document (314) to the original paper document (313) as much as possible to provide high quality reproduction independent of whether the original text or a translated version is used.

Once a rendered version of the paper document (313) is displayed as the projected document (314), the PIC workflow proceeds to monitor various user finger inputs on either the original paper document (313) or the electronic rendering as the projected document (314). The PIC workflow maps the spatial location of the finger gesture to content on the paper document (313) or projected document (314). The finger gesture may be a single tap on identified document content (such as images, tables, paragraphs, etc.) to indicate selection. The finger gesture may also be a creation of a virtual selection box using two fingers on separate hands such that all content that overlaps with the virtual selection box is selected. Furthermore, additional methods may be used to add or remove contents from existing selections.

In order to interact with the paper document (313) or the projected document (314), a set of graphical user interface (GUI) icons (e.g., buttons) are projected onto the surface (316). Using the optical sensor and optional depth sensors of the camera (311), the PIC workflow tracks and identifies finger taps by the user. Accordingly, a representation of the selected content can be generated, e.g., in HTML, and pushed to either a local system clipboard or a cloud-based clipboard. In one or more embodiments, a clipboard is a data buffer for short term data storage and transfer between an operating system and/or application programs.

In one or more embodiments, the objects within the camera view and projector view (e.g., camera view square (313a) and projector view square (314a), respectively) are referenced to a physical mark on the workspace surface. Accordingly, the document image, document extraction, searchable content layout, and layout rendering of the paper document (313) are based on coordinates of the physical mark. In one or more embodiments, the typed, hand written, and/or printed text on the paper document (313) and corresponding content blocks on projected document (314) are cross referenced to one another. In one example, the user may tap on the paper document (313) to select a content block. A highlight pattern is then projected by the projector (312) to either the selected content block on the paper document (313) or the corresponding rendered version of the content block on the projected document (314). In another example, the user may tap on the projected document (314) to select a content block. A highlight pattern is then projected by the projector (312) to either the selected content block on the projected document (314) or the corresponding content block on the paper document (313). In both examples, the highlighted pattern may also be projected onto both the paper document (313) and projected document (314).

Figure 3D:
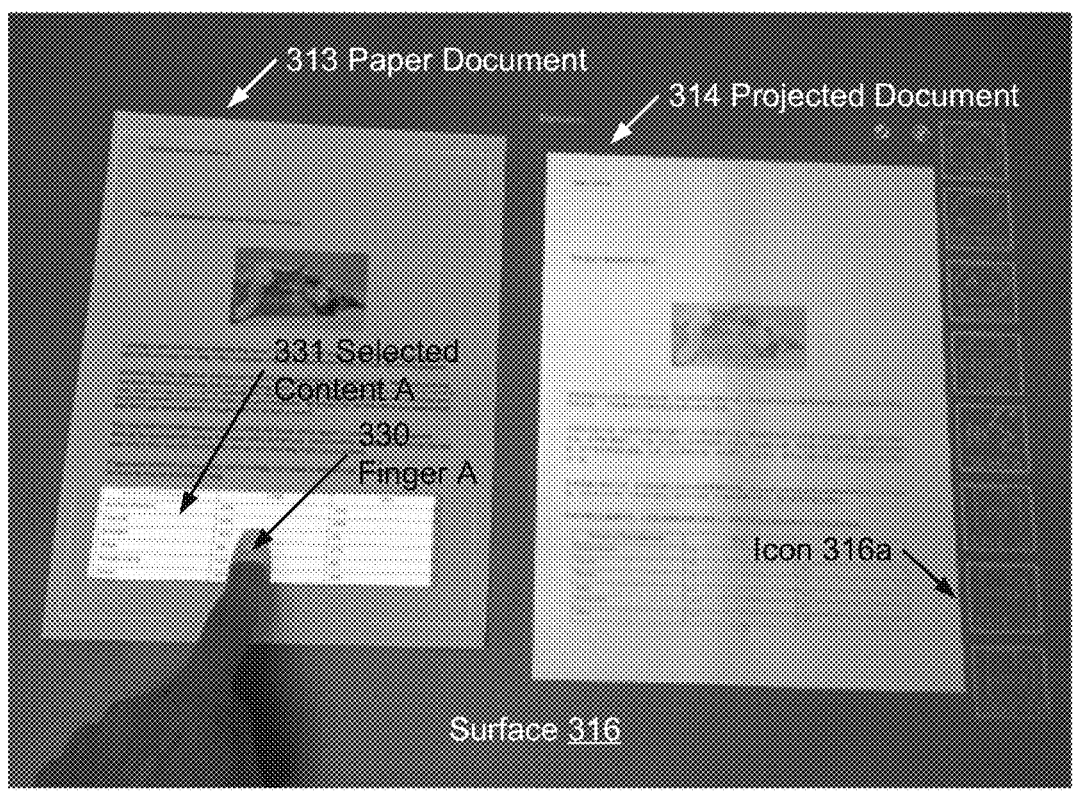
Figure 3E:
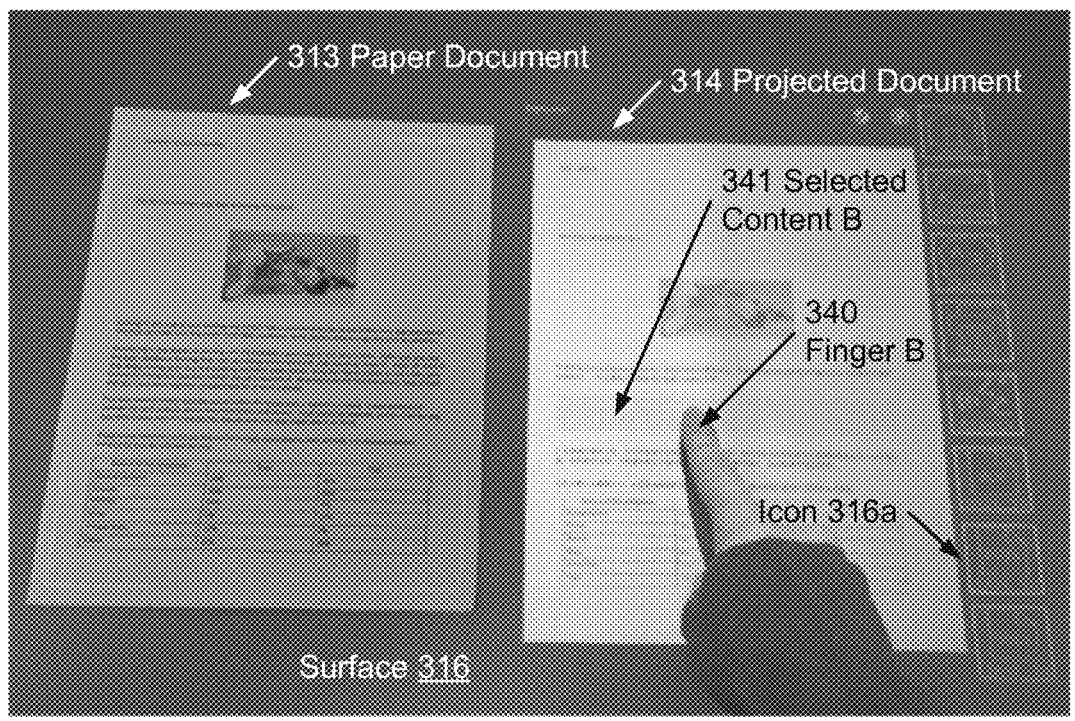

FIGS. 3D and 3E show example methods for a user to acquire specific content from a paper document for pasting into a separate electronic document. In these examples, a paper copy is the only available source of a document where a user is interested in acquiring a paragraph and/or a table for incorporation into the separate electronic document.

In the example shown in FIG. 3D, the user uses a finger A (330) to tap a location on the paper document (313). The system (100) identifies the point of the user's tap with a specific spatial location that is mapped to the bounding box of a table (i.e., selected content A (331)) that was extracted from the paper document (313). The mapping includes transforming the detected finger tap position on the paper document (313) in the camera view to the bounding box location where a highlight pattern is to be projected in the projector view. Accordingly, the bounding box of the table (i.e., selected content A (331)) is highlighted by the projected highlight pattern to confirm user selection. Based on a command (e.g., "cut") activated using the GUI icon (316a), the corresponding content (i.e., selected content A (331)) is placed on the clipboard for pasting into a separate electronic document. As discussed above, the GUI icon (316a) and the projected document (314) are projected onto the surface (316) by the projector (312).

In the example shown in FIG. 3E, the user uses a finger B (340) to tap a location on the projected document (314), which is a representation of the paper document (313) but with translated text. This location is mapped to a paragraph (i.e., selected content B (341)) of translated text from an extracted text block of the paper document (313). Accordingly, the bounding box of the translated text is highlighted to confirm user selection. Based on a command (e.g., "cut") activated using the GUI icon (316a), the corresponding content (i.e., selected content B (341)) is placed on the clipboard for pasting into a separate electronic document. As noted above, the GUI icon (316a) and the projected document (314) are projected onto the surface (316) by the projector (312).

In the example described in FIGS. 3D and 3E, the user may initiate the finger tap selection by visually identifying the table in the paper document (313) or the paragraph in the projected document (314) as the specific content to be acquired. Alternatively, the table in the paper document (313) or the paragraph in the projected document (314) may be initially highlighted as a returned search result according to a search phrase inputted by the user to a search tool. The search tool may be provided by an operating system or software application installed on the system (100). The search phrase may be in the original language or in the translated language. In other words, the user identifies the specific content to be acquired using the search tool that matches the search phrase to the machine-encoded text in the document extraction (103) or the searchable-content layout (104).

A search result highlight pattern is then added to the bounding box of the matched machine-encoded text in the document extraction (103) or the searchable-content layout (104). Based on the aforementioned mapping, the table in the paper document (313) or the paragraph in the projected document (314) is highlighted as the returned search result. Accordingly, the user initiates the finger tap as a result of visually detecting the search result highlight pattern that identifies the returned search result. The finger tap causes a different highlight pattern to be projected to confirm the user selection. The user selection may correspond to the entire returned search result or a portion of the returned search result.

FIGS. 4A-4M show an implementation example in accordance with one or more embodiments of the invention. The implementation example shown in FIGS. 4A-4M is based on the system, method flowchart, and implementation example described above in reference to FIGS. 1, 2A, and 3A-3C. In one or more embodiments, one or more elements shown in FIGS. 4A-4M may be omitted, repeated, and/or organized in a different arrangement. Accordingly, the scope of the invention should not be considered limited to the specific arrangement of elements shown in FIGS. 4A-4M.

Specifically, FIGS. 4A-4M show a layout approximating process by which a layout that approximates the layout of the original paper document (313) is generated.

The first step (i.e., Step 1) of the layout approximating process is to identify the size of the paper document (313). Various image processing techniques (e.g., edge detection) are performed to identify the edges of the paper document (313). Once the edges are identified, the number of pixels of the paper document (313) in the horizontal direction and the number of pixels of the paper document (313) in the vertical direction are identified in the camera view. Based on the field of view angle, resolution, and height of the camera (311) above the surface (316), the system (100) converts the number of pixels of the paper document (313) to computed dimensions of the paper document (313) in inches or millimeters.

Based on the computed dimensions of the paper document (313) in inches or millimeters, the system (100) selects a predetermined paper size (e.g., letter, A4, legal, etc.) that most closely matches the computed dimensions of the paper document (313). The predetermined paper size may be selected from paper sizes commonly used by those skilled in the art. If a match is not found between the computed dimensions of the paper document (313) and the paper sizes commonly used by those skilled in the art, a custom paper size is used based on the computed dimensions of the paper document (313).

The second step (i.e., Step 2) of the layout approximating process is to determine avoidance regions, which are regions of the document where text may not be positioned. This second step is performed by iterating over all non-text content blocks in the extraction to determine a buffered bounding box for each non-text content block. The buffered bounding box is determined by extending the original bounding box in all four directions until the extension intersects with the bounding box of any text block in the extraction. An example algorithm for determining avoidance regions in Step 2 is listed in TABLE 2 below where bounding box is denoted as bbox.

TABLE 2

```
repeat for all the extracted content:
    if content is non-text, then
        set top_buf, left_buf, bottom_buf, and right_buf to infinity
```

TABLE 2-continued

```
// This first pass finds what text, if any, lies above / below the content's bbox
// and extends the bbox to the closest text or page border otherwise
repeat for all lines in the extracted content:
    if the top of the line's bbox is greater than the bottom of the content's bbox then
        set bottom_buf to min(bottom_buf, distance from the content's bbox to the line)
    if the bottom of the line's bbox is less than the top of the content's bbox then
        set top_buf to min(top_buf, distance from the content's bbox to the line)
if the top_buf is not infinity, then
    set the top of the content's bbox to the top of the content's bbox − top_buf
else
    set the top of the content's bbox to the top of the page
If the bottom_buf is not infinity, then
    set the bottom of the content's bbox to the bottom of the content's bbox + bottom_buf
else
    set the bottom of the content's bbox to the bottom of the page
// This second pass finds what text, if any, lies to the left / right of the vertically
// expanded content's bbox and extends the bbox to the closest text or page border
// otherwise
repeat for all lines in the extracted content:
    if the top of the line's bbox is less than the bottom of the content's bbox and the
    bottom of the line's bbox is greater than the top of the content's bbox then
        if the left of the line's bbox is greater than the right of the content's bbox
            set right_buf to min(right_buf, distance from the content's bbox to the line)
        if the right of the line's bbox is less than the left of the content's bbox
            set left_buf to min(left_buf, distance from the content's bbox to the line)
if the left_buf is not infinity, then
    set the left of the content's bbox to the left of the content's bbox − left_buf
else
    set the left of the content's bbox to the left of the page
If the right_buf is not infinity, then
    set the right of the content's bbox to the right of the content's bbox + right_buf
else
    set the right of the content's bbox to the right of the page
```

Once the avoidance regions are identified, the third step (i.e., Step 3) of the layout approximating process is to perform the layout for all the text blocks in the extraction. The third step of the layout approximating process repeats the following sub-steps (i.e., Sub-steps 3.1, 3.2, and 3.3) for each text block to approximate the layout on a per block basis.

Sub-Step 3.1: Identification of the Layout Rectangle

The region where text may be positioned on the page of the projected document (314) is identified as the layout rectangle, which is equivalent to the text block's bounding box (i.e., the union of all paragraph's bounding boxes in the text block).

Sub-Step 3.2: Accumulation of Statistics and Identification of the Point Size Scale For each paragraph in the text block, some statistics are gathered. This includes the average word height of all words in the paragraph as well as the spacing to the next paragraph. Furthermore, the overall average word height of all words in the text block is computed.

Once the statistics have been gathered, then a point size scale factor for each paragraph is identified. For each paragraph, the ratio of the average word height for the paragraph to the overall average word height is computed. If the ratio is above a predetermined high threshold (e.g., 1.2), then the point size scale factor is set to that ratio. If the ratio is below a predetermined low threshold (e.g., 0.8), then the point size scale factor is set to that ratio. Otherwise, if the ratio is between the predetermined high threshold and low threshold, the point size scale is set to 1.

Sub-Step 3.3: Fitting of the Layout

The layout approximating process then moves on to fitting the layout. For this sub-step, text is iteratively laid out paragraph-by-paragraph at a particular point size in the layout rectangle while avoiding all avoidance regions computed earlier starting with a predetermined seed point size. If a particular paragraph has an associated point size scale, then the current point size is scaled by the point size factor. After all the text of a paragraph has been laid out, the text of the next paragraph is laid out after moving down a distance equivalent to the spacing to the next paragraph as previously-computed in Sub-step 3.2. The text of the paragraph is either the original text extracted from the paper document or a translation of the original text. Once all of the text is laid out, it is determined whether the laid-out text falls short of or exceeds the bottom of the layout rectangle. In a case where the laid-out text exceeds the bottom of the layout rectangle, the point size is decreased by a predetermined amount and Sub-step 3.3 is repeated. In a case where the laid-out text falls short of the bottom of the layout rectangle, the point size is increased by the same predetermined amount and Sub-step 3.3 is repeated. The repetition of Sub-step 3.3 continues until a fit is determined between the laid-out text and the bottom of the layout rectangle.

An example algorithm for fitting the layout in Sub-step 3.3 is listed in TABLE 3 and TABLE 4 below where point size is denoted as pt_size.

TABLE 3

```
set pt_size to a seed point size (e.g. 11)
set satisfied to false
set max_explored_size to pt_size
repeat while satisfied is false:
    set max_explored_size to the max(max_explored_size, pt_size)
```

TABLE 3-continued

```
set x_pos to the left edge of the layout rect
set y_pos to the top edge of the layout rect
repeat for each paragraph in the text block:
    generate a font at the size of pt_size * the point size scale for the paragraph
    call a function, perform_ layout( ), to layout the text of the paragraph using the generated
    font which returns the bounding box of the laid out text.
    set x_pos to max(x_pos, right edge of the bounding box of the laid out text)
    set y_pos to the bottom of the bounding box of the laid out text + spacing to the next
    paragraph
    if ((x_pos > the right of the layout rectangle OR y_pos > the bottom of the layout rect) AND
    pt_size > 1)
        decrease pt_size by a predetermined amount (e.g. 1)
    else if (x <= the left of the layout rectangle AND y <= the bottom of the layout rectangle
    AND
        max_explored_size <= pt_size)
        increase pt_ size by a predetermined amount (e.g. 1)
    else
        set satisfied to true
return pt_size, saving it as the seed for a possible future execution
```

The algorithm for the perform_layout( ) function referenced in TABLE 3 above is listed in TABLE 4 below.

TABLE 4

```
identify the text to be laid out (either the original paragraph's text or a translation thereof)
set lines_remaining to true
repeat while lines_remaining is true:
    // Estimate the height of this line
    set y_min to y_pos
    set y_max to y_min + height of the font
    // Create a span for this line across the entire layout rectangle and see if it intersects with
    // any avoidance regions. If so, find and remove those intersections.
    create a span (left, right bounds) equal to the left and right bounds of the layout rect
    push the single span onto a list of final_spans
    set min_avoid_bot to infinity
    repeat for all avoidance regions:
        create an empty list of clipped_spans
        if the line spanning y_min and y_max intersects the avoidance region
            create an avoid_span equal to the left and right bounds of the avoidance region
            while final_spans is not empty
                remove a span from final_spans and call it s
                remove the portions of s that intersect with avoid_span and add those to
                clipped_spans
            set final_spans equal to clipped_spans
            set min_avoid_bot to min(min_avoid_bot, bottom of the avoidance region)
    if final_spans is empty
        // No spans could be built at y_pos. Advance to the bottom of the shortest avoidance
        // region and try again.
        set y_pos to min_avoid_bot
    else
        // Every span in final_spans can be filled with text
        for every span in final_spans
            layout text in the space provided by span
            if there is no more text remaining
                set lines_remaining to false
                break out of the local loop
        increment y_pos by the max height of all the just laid out spans
return the bounding box of all the laid out text0
```

The fourth step (i.e., Step 4) of the layout approximating process is to render the remainder of the paper document. Once the text has been laid out, then other non-text content is drawn. For example, extracted images are rendered to corresponding specified bounding boxes. Vector graphics, other shapes, and tables are likewise drawn into corresponding regions on the page of the paper document.

It is noted that the layout approximating process described in the steps above may be recursively applied to layout text contained in nested content blocks, such as container objects (e.g., shapes, table cells, or any other non-text content blocks) that contain text blocks. In other words, the area of the container object is treated as a miniature paper document where the layout approximating process described above is applied to layout the text within each miniature paper document.

Figures 4A, 4B:
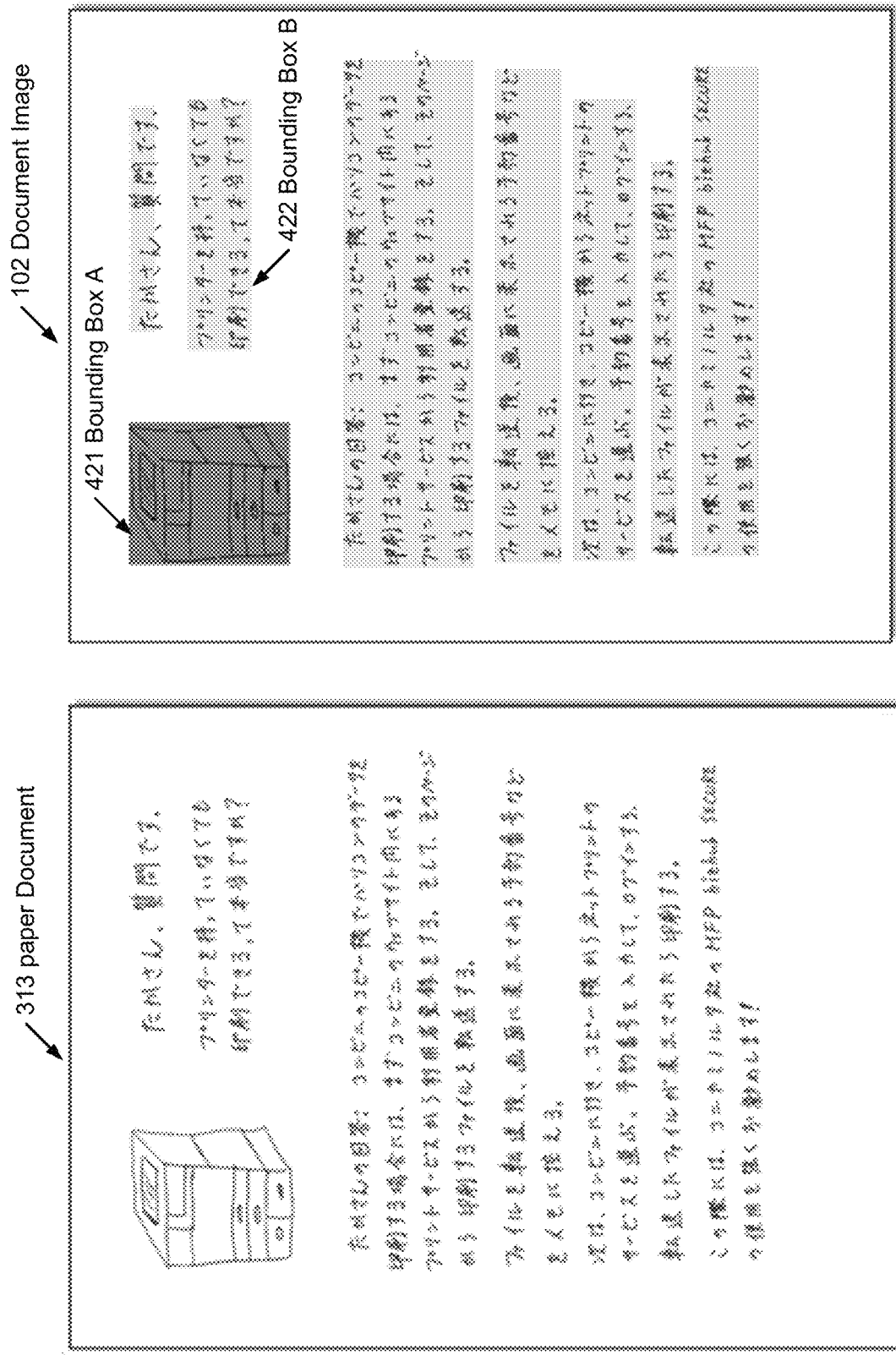
FIGS. 4A-4M show an implementation example in accordance with one or more embodiments of the invention.

To illustrate the layout approximating process described above, FIG. 4A shows an example of the paper document (313) where the layout approximating process is performed. FIG. 4B shows an example of a high resolution image of the paper document (313) shown as the document image (102) previously discussed above in reference to FIG. 1. In this example of the document image (102), the corresponding document extraction (103) includes one text block of seven paragraphs with bounding boxes (e.g., bounding box B (422)) highlighted in light gray, as well as one image with bounding box (i.e., bounding box A (421)) highlighted in dark gray. Note that each paragraph may also be considered as an individual text block.

FIG. 4B further shows the bounding boxes as overlaid on the document image (102) for illustration purposes. The dimensions and locations of the bounding boxes are specified in the document extraction (103) and are not explicitly shown in FIG. 4B. In order to construct the layout for searchable content that approximates the original layout of the paper document (313), the paper size is first computed. Based on the camera specifications and the height of the camera (311) above the paper document (313), the system (100) converts horizontal and vertical pixel counts of the document image (102) to determine that the paper document (313) is approximately 8.5 inches wide and 11 inches high. For these particular dimensions, a paper size of "U.S. Letter" is selected as the rendering destination.

Figure 4D:
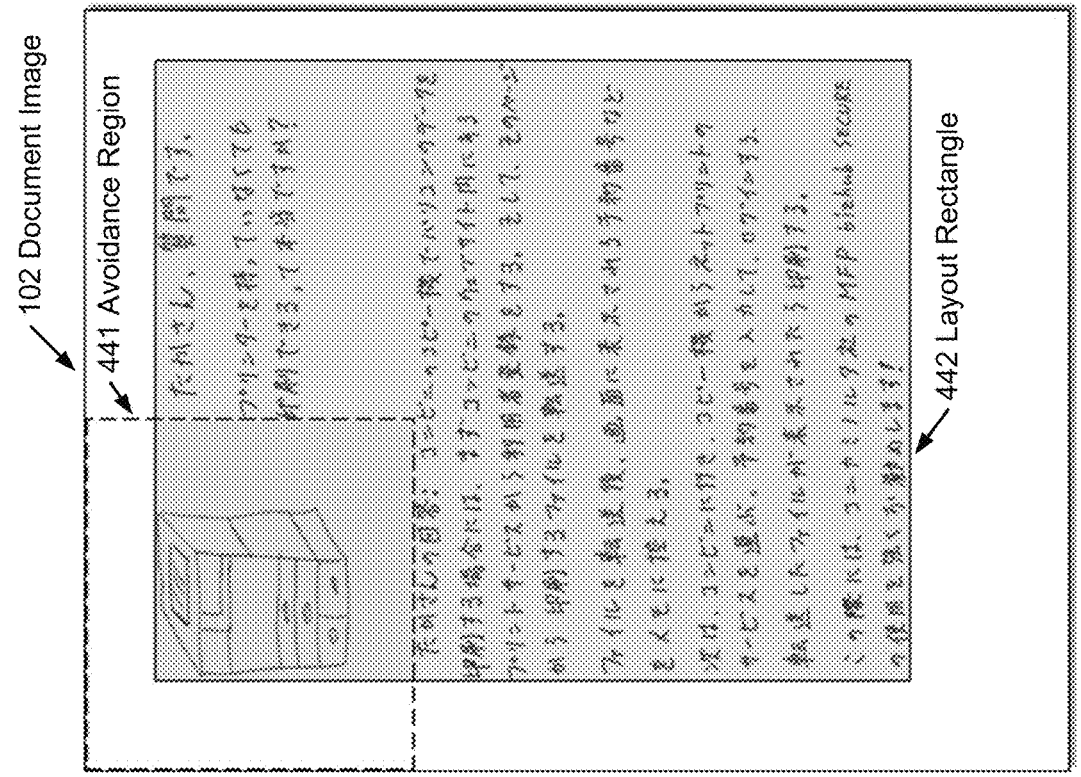
Figure 4C:
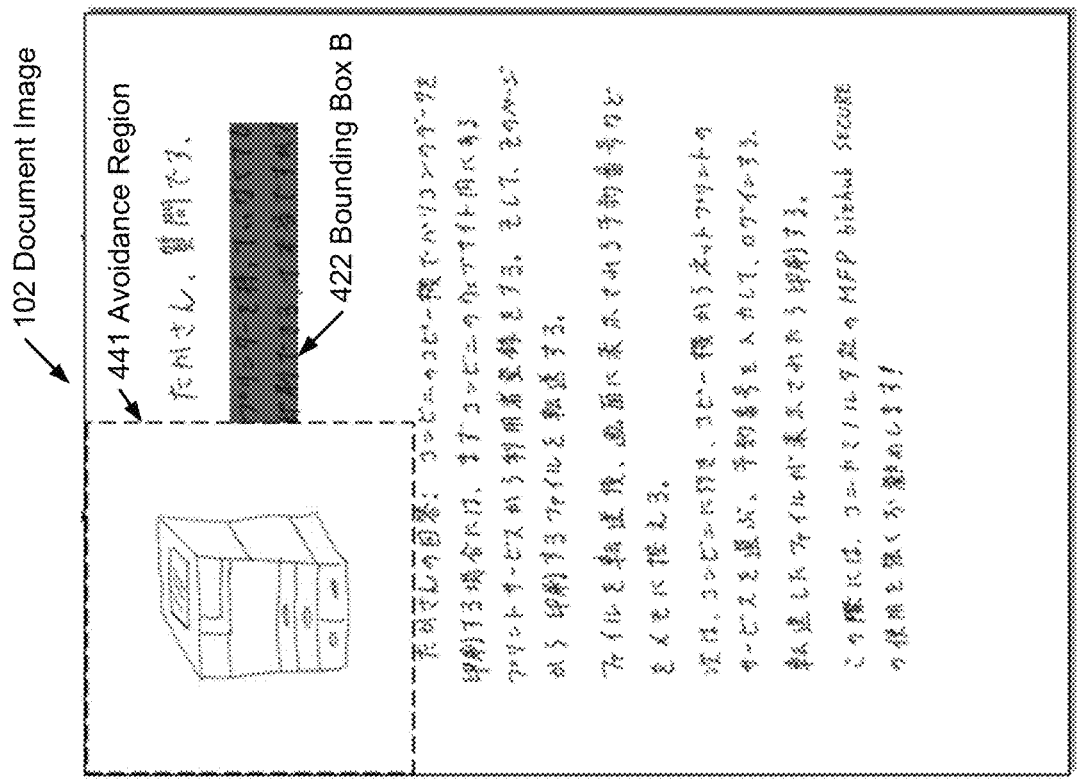

FIG. 4C shows an example avoidance region (441) overlaid on the document image (102). The system (100) builds the avoidance region (441) by starting with the bounding box A (421) extracted from the document image (102) and extending this bounding box A (421) vertically and horizontally until it intersects another text block (e.g., bounding box B (422)) or the page border. This extension process is repeated for all remaining non-text content blocks, if any exist. In one or more embodiments, the system (100) performs the vertical and horizontal extension based on the bounding boxes specified in the document extraction (103).

FIG. 4D shows an example layout rectangle (442) overlaid on the document image (102). The system (100) builds the layout rectangle (442) as the union of the bounding boxes of all paragraphs. Notice there is an overlap between the avoidance region (441) and the layout rectangle (442).

Figure 4E:
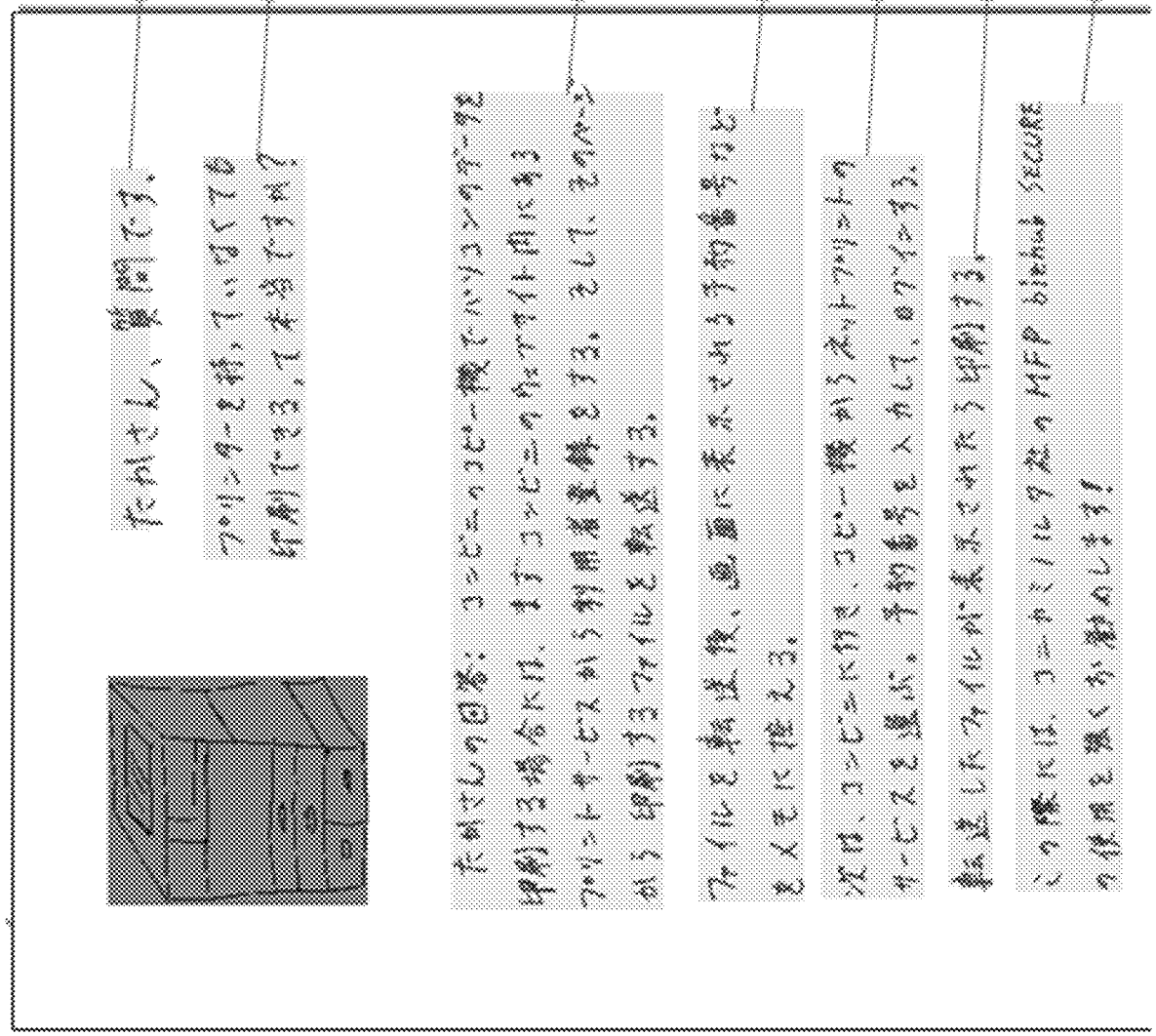

In order to best approximate the layout, the next step is to gather statistics of the text in the paper document (313), such as the average word height of the paragraph, the spacing to the next paragraph, and the overall average word height of the text block. Once the statistics are gathered, the point size scale factor for each paragraph is computed. FIG. 4E shows an example of computed statistics where the average word heights and the spacings to the next paragraph are listed in pixel units and denoted as "avg word height" and "after spacing," respectively. In addition, the point size scale is denoted as "pt ht scale."

For example, the first paragraph has an average word height of 102 pixels. The overall average word height in the paper document (313) is computed to be 113 pixels. The ratio of the average word height in the first paragraph to the overall average word height is 102/113, which equals 0.9. Since 0.9 is between the predetermined high and low thresholds of 0.8 and 1.2, the point size scale is set to 1 for the first paragraph. The point size scales of other paragraphs are also set in a similar manner.

Figures 4F, 4G:
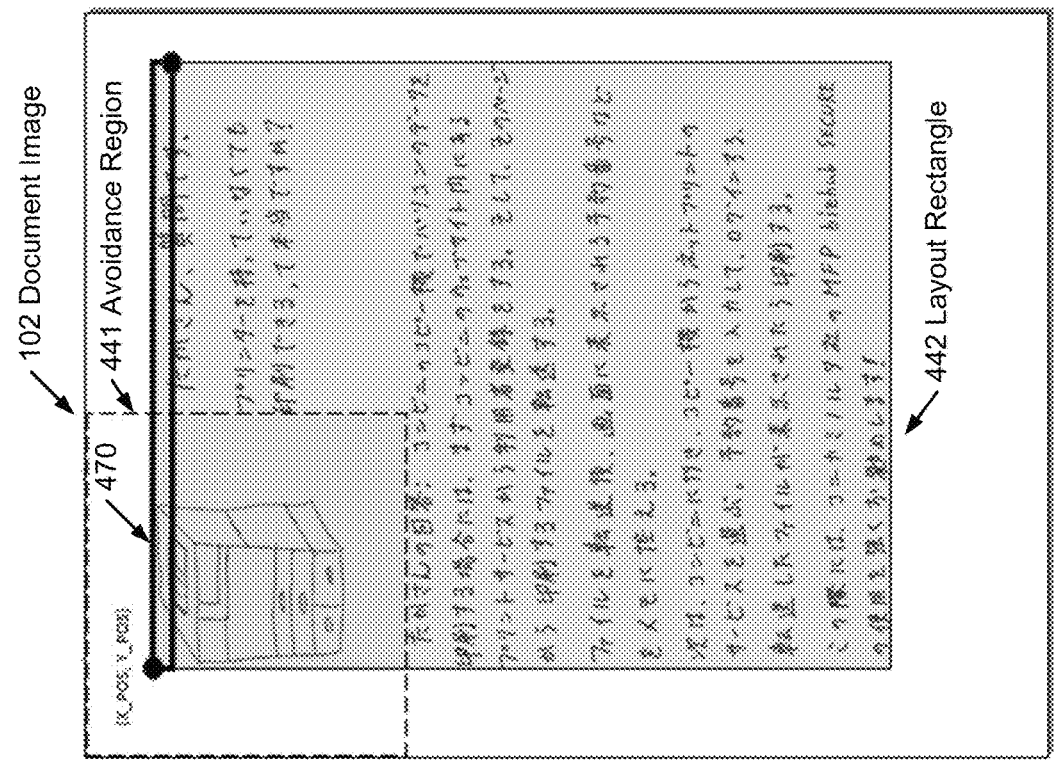
Figure 4I:
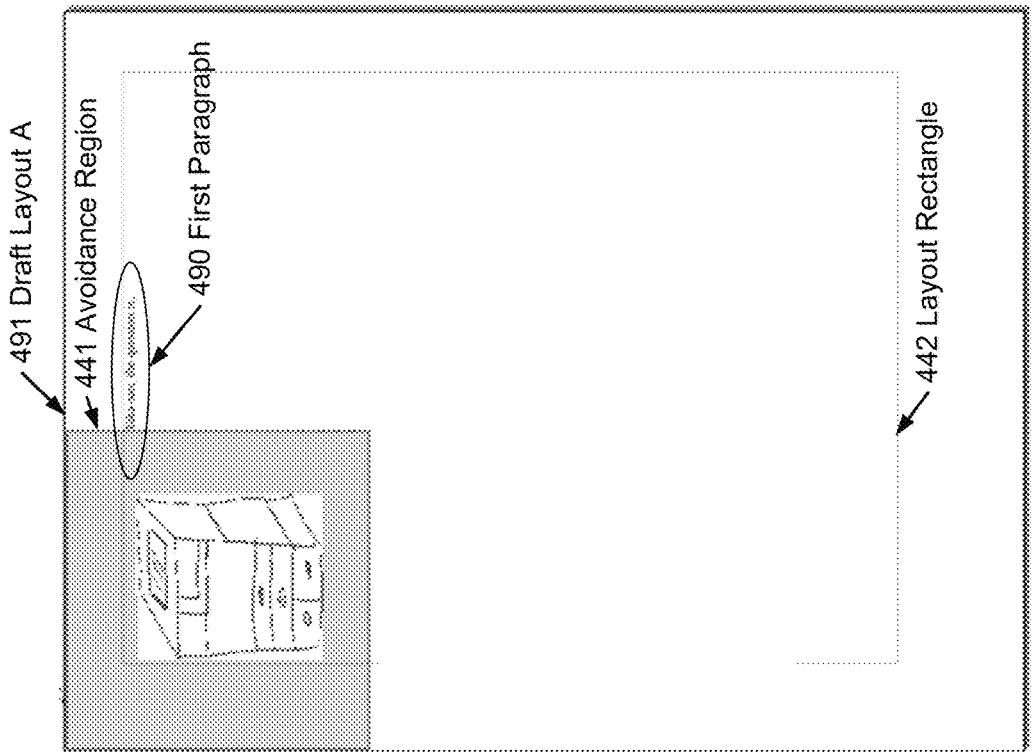

FIGS. 4F-4M show an example of fitting the layout using the algorithms listed in TABLE 3 and TABLE 4 above. Initially, in the algorithms listed in TABLE 3 and TABLE 4, pt_size is set to the seed size of 11, satisfied is set to false, and max_explored_size is set to 11. Since satisfied is false, a fitting iteration at 11 points is executed initially by setting max_explored_size to 11, and setting (x_pos, y_pos) to the upper left corner (460) of the layout rectangle (442). FIG. 4F shows the (x_pos, y_pos) being set to the upper left corner (460) that is overlaid on the document image (102).

Next, the function perform_layout( ) is called to layout the text with pt_size at 11 points. The function perform_layout( ) first identifies that the translated text is requested, so the translation for this paragraph is obtained. Within the function perform_layout( ), lines_remaining is set to true to initiate the line layout loop as described below in reference to FIGS. 4G-4I.

FIG. 4G shows, as overlaid on the document image (102), a bounding box (470) that is created with y_min set to y_pos, y_max set to the height of the font, and with a span between the left/right bounds of the layout rectangle (442). The bounding box (470) is for the first line to be laid out. However, before text is laid out in the bounding box (470), the bounding box (470) is adjusted to remove any intersection with the avoidance region (441).

Figure 4H:
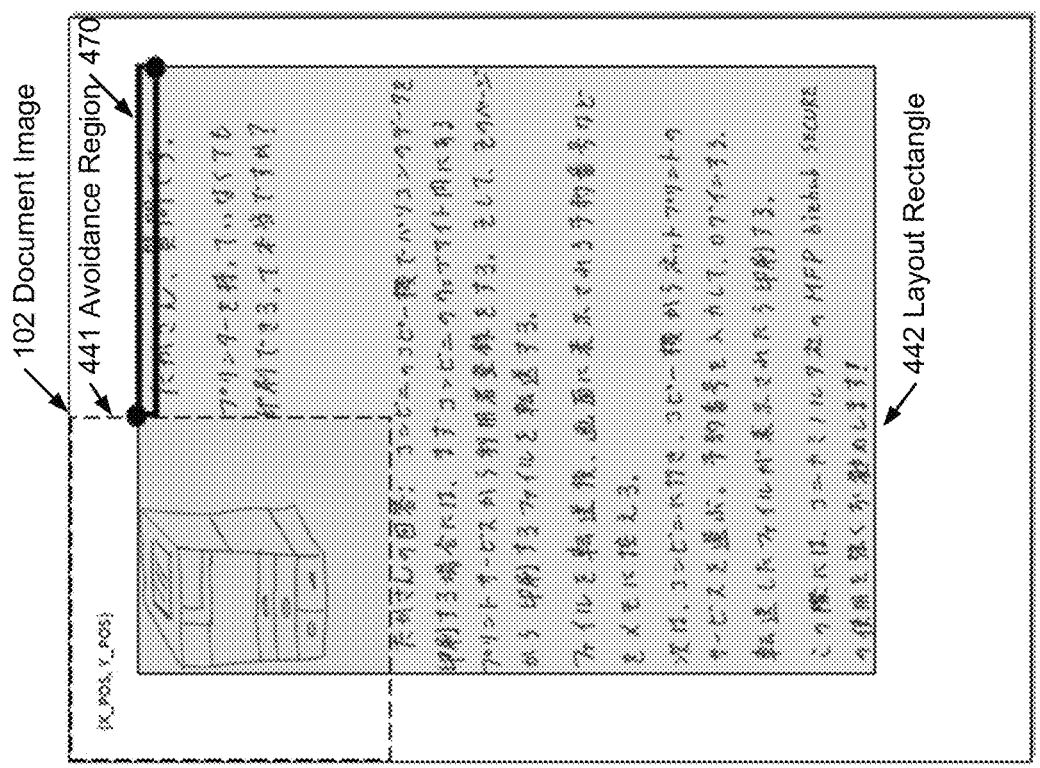
Figure 4K:
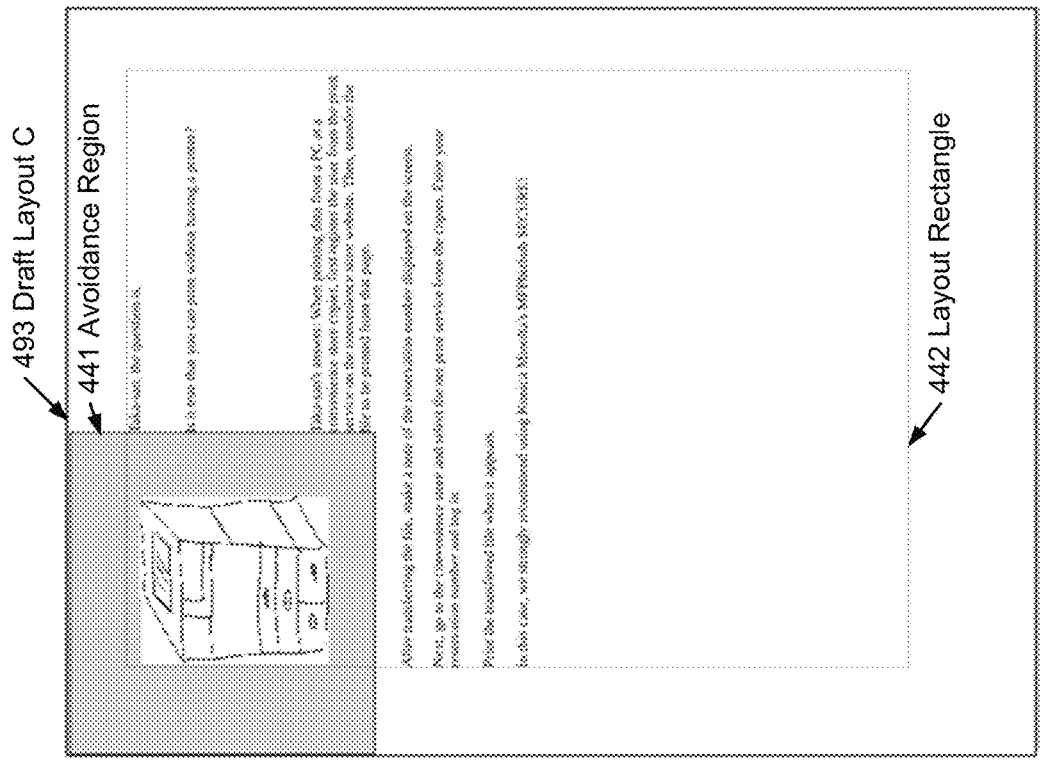
Figure 4J:
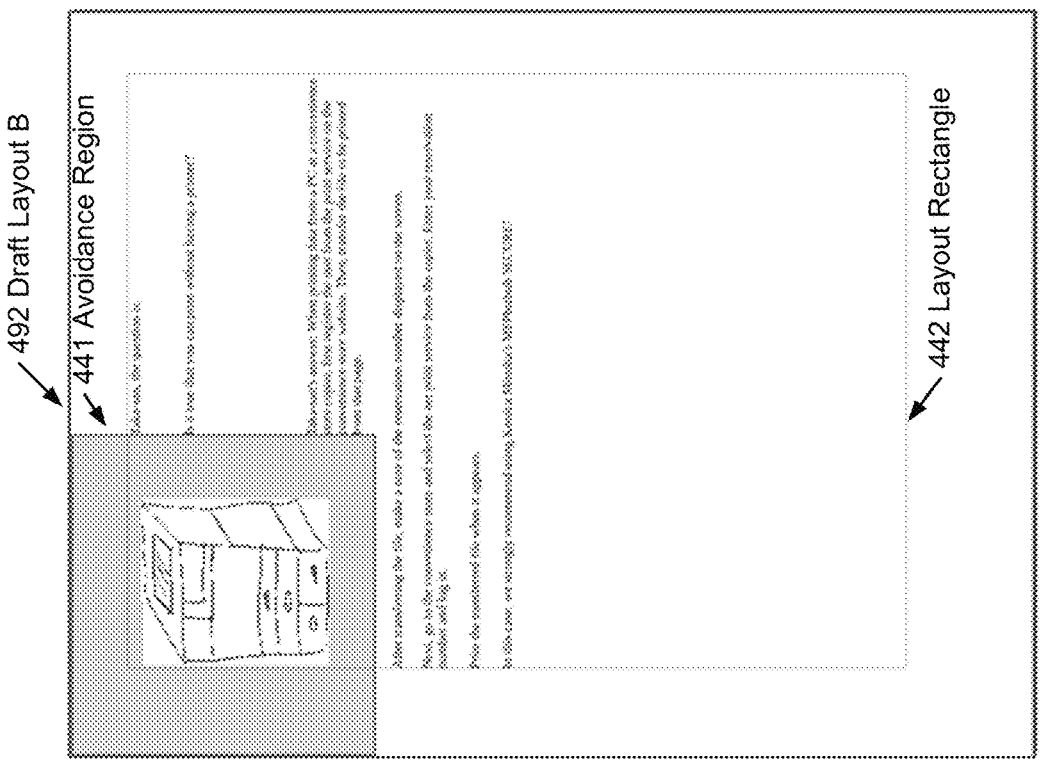

FIG. 4H shows, as overlaid on the document image (102), the bounding box (470) after the intersection with the avoidance region (441) is removed. Based on the bounding box (470) depicted in FIG. 4H, the first paragraph (490) is laid out to generate the draft layout A (491) shown in FIG. 4I. Note that the draft layout A (491) through draft layout D (494) and the final layout (495) shown in FIGS. 4H-4M are based on the paper size determined by the system (100) from the document image (102). Alternatively, the draft layout A (491) through draft layout D (494) and the final layout (495) shown in FIGS. 4H-4M may also be based on a device independent scale.

The second iteration of the line layout loop is then performed by advancing y_pos to the bottom of the first paragraph (490) plus the spacing to the next paragraph. The iterations are then repeated for each remaining paragraph until all of the text is laid out at 11 points to generate the draft layout B (492) shown in FIG. 4J.

After all of the text is laid out, the function perform_layout( ) then decides that the overall bounding box of all the text in the draft layout B (492) is less than the right and bottom borders of the layout rectangle (442). Accordingly, pt_size is incremented by one to 12 points, max_explored_size set to 12, and the layout is repeated by the function perform_layout( ) to generate the draft layout C (493) shown in FIG. 4K.

Figure 4M:
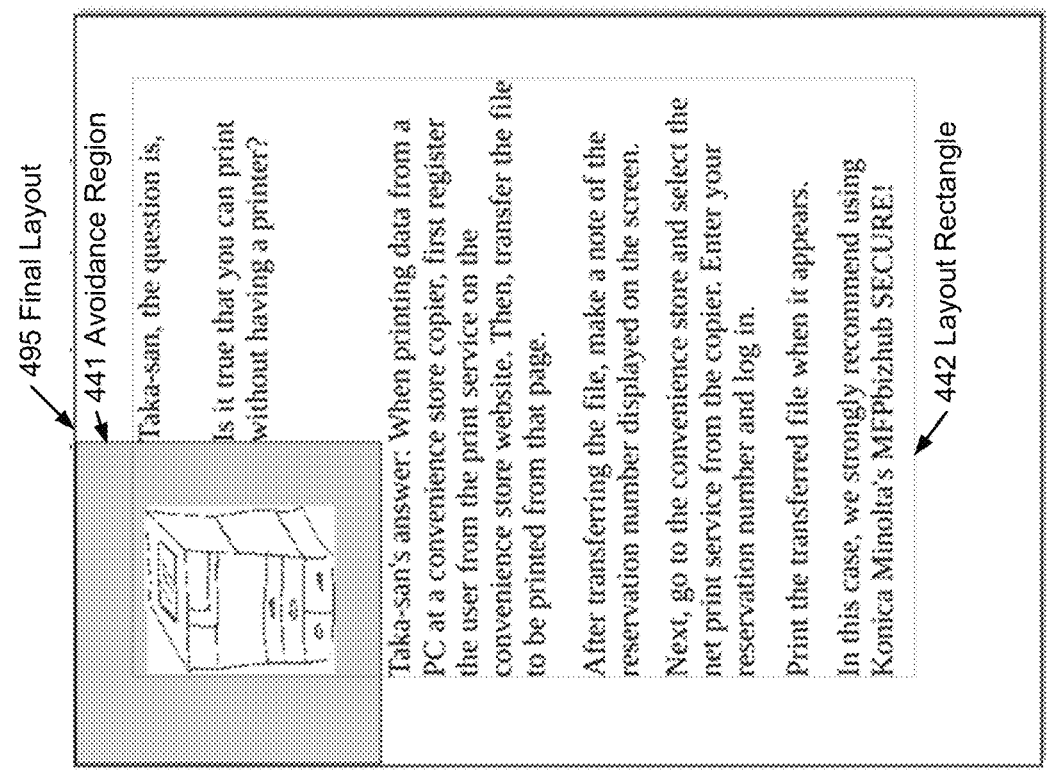
Figure 4L:
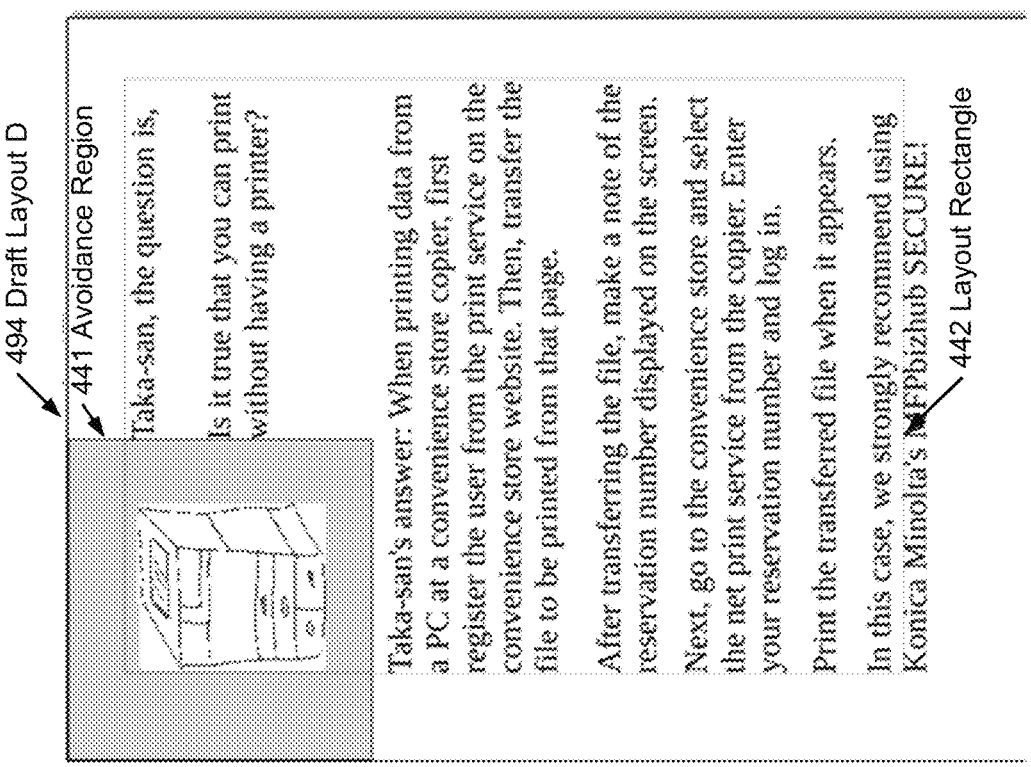

The function perform_layout( ) further decides that the overall bounding box of all the text in the draft layout C (493) is still less than the right and bottom borders of the layout rectangle (442). Accordingly, the layout continues to be iteratively repeated by the function perform_layout( ) until pt_size reaches 26 points when it is determined that the overall bounding box of all the text in the draft layout D (494) exceeds the bottom of the layout rectangle (442), as shown in FIG. 4L.

The function perform_layout( ) then reduces pt_size to 25 points. Since max_explored_size of 26 is not less than the current pt_size of 25, the iterations of function perform_layout( ) stops with the final layout (495) at text point size of 25 points, as shown in FIG. 4M.

FIGS. 5A-5G show an implementation example in accordance with one or more embodiments of the invention. The implementation example shown in FIGS. 5A-5G is based on one or more of the system, method flowchart, and implementation example described in reference to FIGS. 1, 2B, and 3A-3E above. In one or more embodiments, one or more elements shown in FIGS. 5A-5G may be omitted, repeated, and/or organized in a different arrangement. Accordingly, the scope of the invention should not be considered limited to the specific arrangement of elements shown in FIGS. 5A-5G.

The implementation example shown in FIGS. 5A-5G illustrates various selection methods to copy content from the paper document (313) or from the projected document (314) to a clipboard (either the local system clipboard or a cloud clipboard). The copied content on the clipboard may be pasted into a separate electronic document. Contents are selected by monitoring user finger taps or other user gestures. Selected contents are highlighted to provide the user feedback regarding which content is currently selected.

Figure 5A:
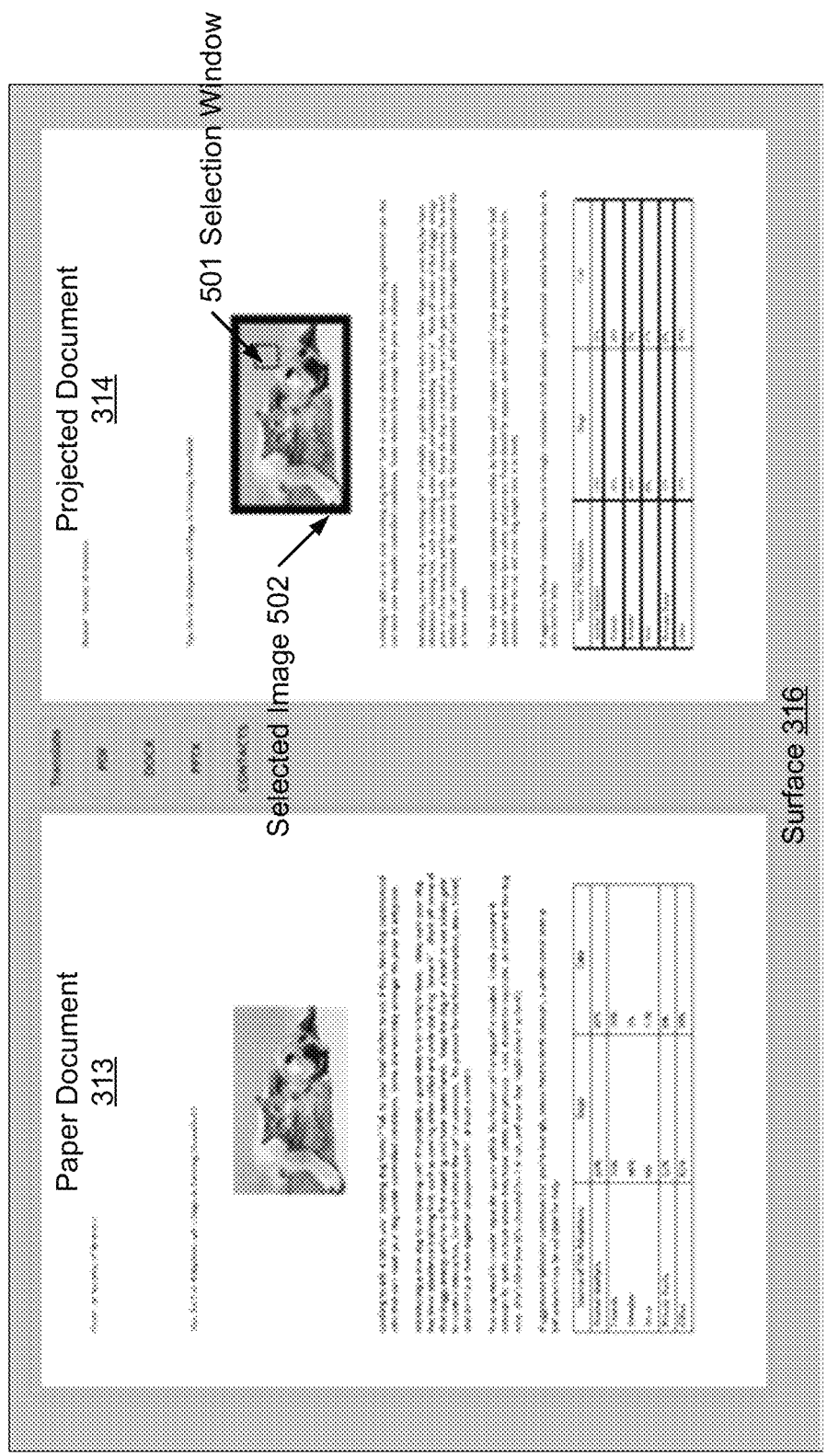
FIGS. 5A-5G show an implementation example in accordance with one or more embodiments of the invention.

FIG. 5A shows a single finger tap selection method that starts with a high resolution capture of the paper document (313) where extracted contents are rendered and projected onto the surface (316) as the projected document (314). Note that the projected document (314) has substantially the same size as the paper document (313) because the searchable content layout of the paper document (313) is based on the paper size determined from the corresponding document image. Alternatively, the searchable content layout of the paper document (313) may be based on a device independent scale while the size of the projected document (314) is adjusted by the rendering engine (110) including a transformation from the camera view of the camera device to the projector view of the projector device.

Although not explicitly shown, the rendering may include a translation of the text. During rendering, bounding boxes of all rendered content blocks are determined and stored. In the example shown in FIG. 5A, the user taps on top of an image within the projected document (314). The position of the finger tap may be provided in projector view by the system (100). A small square selection window (501) is identified through monitoring/detecting user finger taps and other user gestures. The size of the selection window (501) is preconfigured on the system (100). For example, the preconfigured selection window size may be in inches or millimeters as set by an explicit input from the user. Alternatively, the preconfigured selection window size may be automatically identified after a training session with the user.

To identify the selection window (501), a finger tap window surrounding (e.g., centered on) the detected finger tap position is generated to have the preconfigured size specified above. Accordingly, the bounding boxes of all top-level content blocks are investigated to detect any intersection with the finger tap window. Any bounding box that intersects the finger tap window is added to a list of selection candidates where the bounding box with the largest intersection area is identified as the current selection. One or more of the document extraction (103), the searchable content layout (104), and the layout rendering (105) may be investigated by the system (100) to determine the intersection between the bounding boxes and the finger tap window.

Because the image is the only content block that overlaps the selection window (501) in FIG. 5A, the image is identified as the current selection (i.e., selected image (502)). Because the selected image (502) contains no nested content, a selection vector with a single entry is generated and the selected image (502) is highlighted and placed on the clipboard.

FIGS. 5B-5E show a selection method for a sequence of single finger taps on nested content. Specifically, FIGS. 5B-5E show the sequence of single finger taps on the paper document (313) that is performed by the user subsequent to the single finger tap on the projected document (314) as shown in FIG. 5A.

In FIGS. 5B-5E, the single finger tap selection method described above in FIG. 5A is recursively applied to any nested content blocks. For example, if the current selection at the top level is a table, then the single finger tap selection method is repeated for any cells within the table as a miniature document, then repeated for any text blocks within the cell as a miniature document, then repeated for any paragraphs within the text block as a miniature document, and finally repeated for any words within the paragraph as a miniature document. These recursively-generated current selections at successive nesting levels are concatenated to form a selection vector. In the selection vector, the content block of the current selection at the vector element position p is contained in the content block of a higher level current selection at the vector element position p−1, with the exception of the first vector element in the selection vector. In this context, the current selection at the vector element position p−1 is the parent of the current selection at the vector element position p.

In applying the single finger tap selection method described above in FIGS. 5B-5E for each single finger tap in the sequence, if the current selection is not found in the selection vector, then the last vector element (i.e., the content block at the lowest nesting level) in the selection vector is selected as the current selection. Otherwise, the parent of the current selection from the previous single finger tap in the sequence is selected as the current selection. If no parent exists, then nothing is selected and the current selection is set to null. The use of the selection vector allows the user to "scroll" through possible selections of nested content blocks with subsequent finger taps on the same position within the paper document (313) or the projected document (314).

If no selection vector was built or if the selection vector is empty (i.e., the finger tap did not land on any content block of the paper document), then nothing is selected and the current selection is set to null.

Figure 5B:
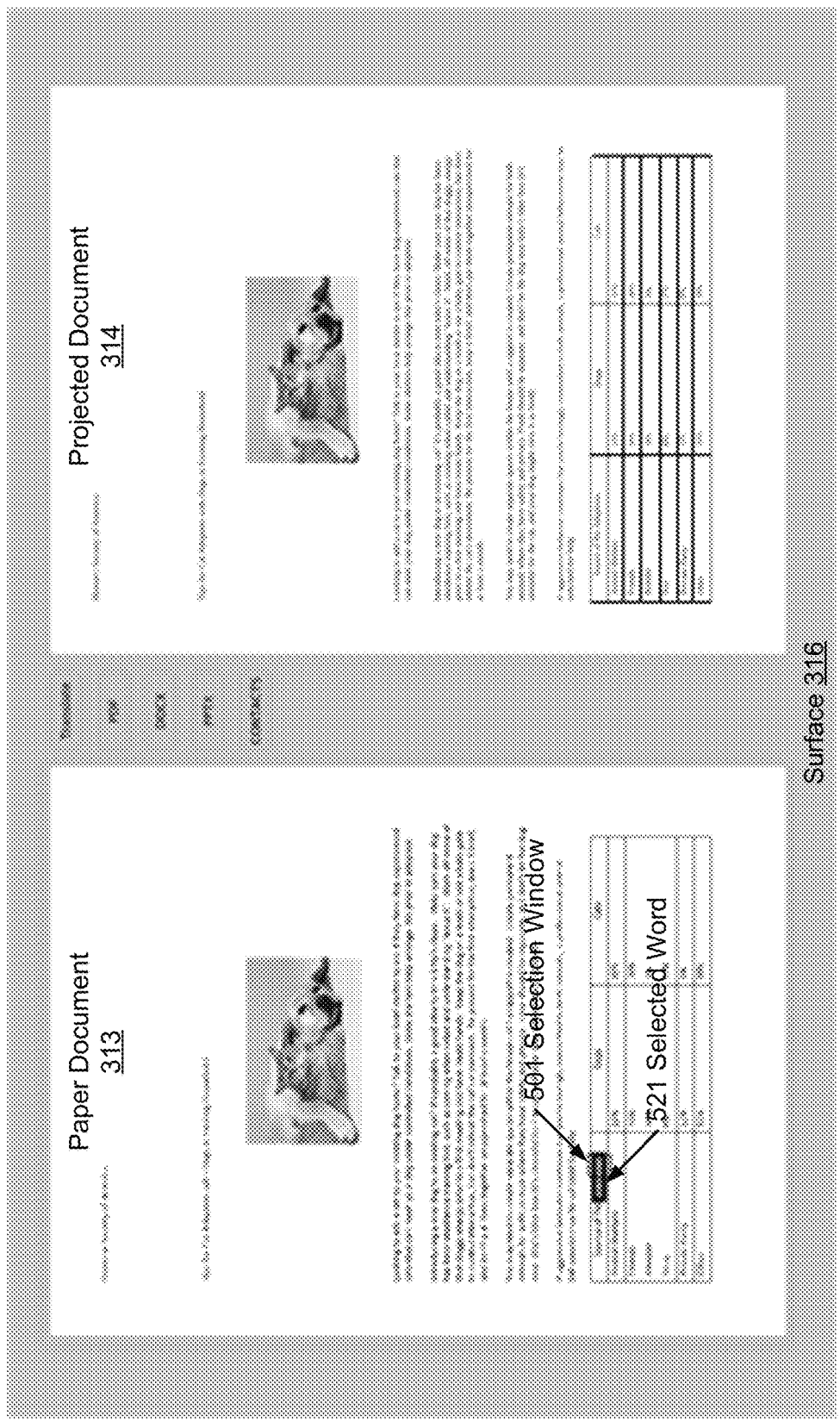

As shown in FIG. 5B, the user taps on a word in the table (e.g., "Adoptions") within the paper document (313). The selection window (501) identifies the finger tap position over the word. In addition, the selection vector listed in TABLE 5 is generated.

TABLE 5

TABLE
CELL (cell # 1)
PARAGRAPH ("Source of Pet Adoptions")
WORD ("Adoptions")

Given that the current selection from the previous finger tap shown in FIG. 5A is the selected image (502), which is not in the selection vector listed in TABLE 5, the last vector element (WORD "Adoptions") is selected as the current selection for the finger tap on "Adoptions" at this time. The selected word (521) "Adoptions" is highlighted and placed on the clipboard.

Figure 5C:
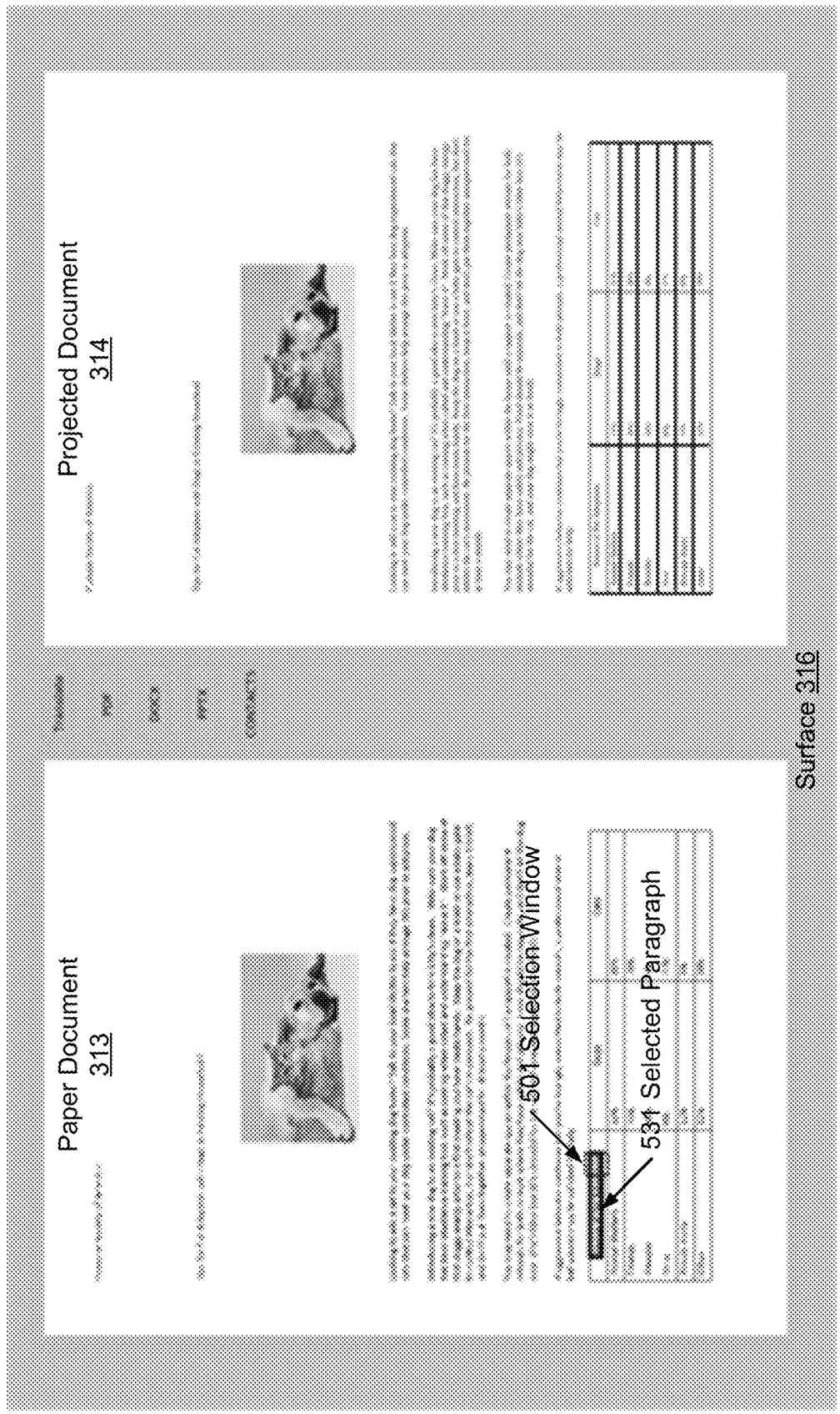

As shown in FIG. 5C, the user taps at the same position on the paper document (313) a second time identified by the selection window (501). Because the current selection (i.e., selected WORD (521) "Adoptions" shown in FIG. 5B) from the previous finger tap is in the selection vector, the parent (PARAGRAPH "Source of Pet Adoptions") of the selected WORD (521) "Adoptions" in the selection vector is selected as the current selection at this time. In other words, the current selection is changed from the selected word (521) "Adoptions" to the selected paragraph (531) "Source of Pet Adoptions," which is highlighted and placed on the clipboard.

Figure 5D:
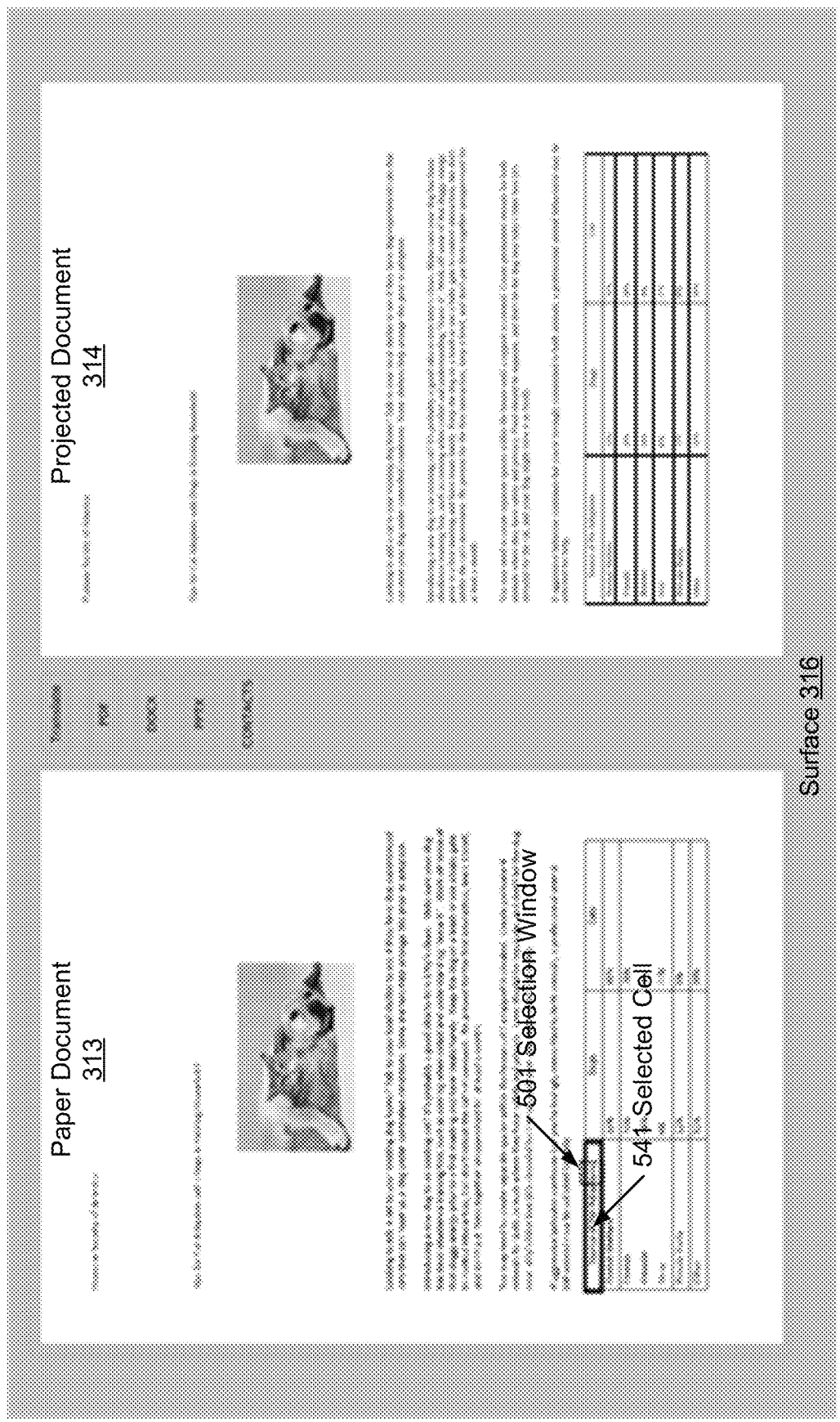

As shown in FIG. 5D, the user taps at the same position in the paper document (313) a third time identified by the selection window (501). Because the current selection (i.e., selected paragraph (531) "Source of Pet Adoptions" shown in FIG. 5C) from the previous finger tap is in the selection vector, the parent (CELL "cell #1") of the selected paragraph (531) "Source of Pet Adoptions" in the selection vector is selected as the current selection at this time. In other words, the current selection is changed from the selected paragraph (531) "Source of Pet Adoptions" to the selected cell (541) "cell #1," which is highlighted and placed on the clipboard.

Figure 5E:
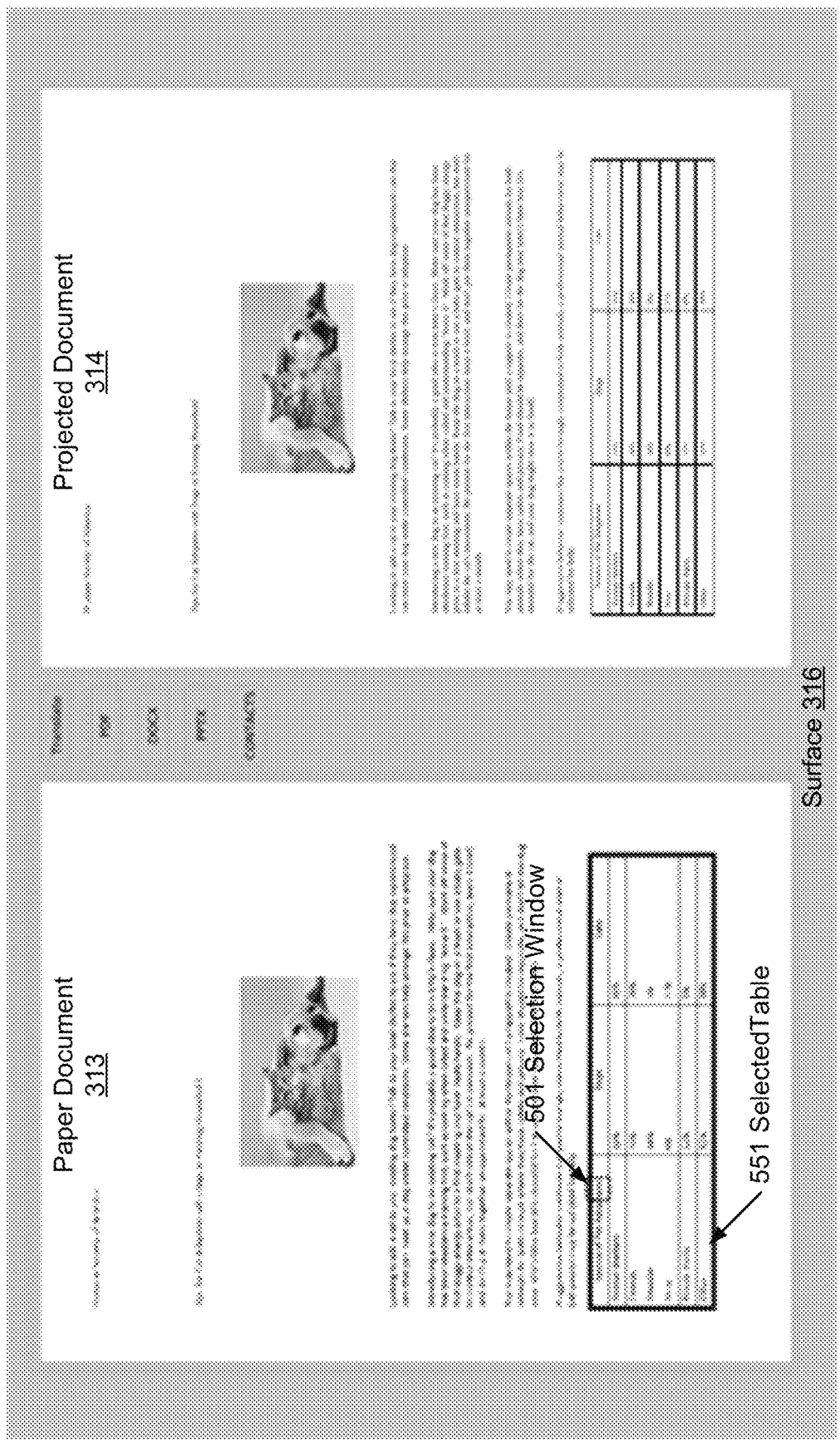

As shown in FIG. 5E, the user taps at the same position in the paper document (313) a fourth time identified by the selection window (501). Because the current selection (i.e., selected cell (541) "cell #1" from FIG. 5D) from the previous finger tap is in the selection vector, the parent (TABLE) of the selected cell (541) "cell #1" in the selection vector is selected as the current selection at this time. In other words, the current selection is changed from the selected cell (541) "cell #1" to the selected table (551), which is highlighted and placed on the clipboard.

Figure 5F:
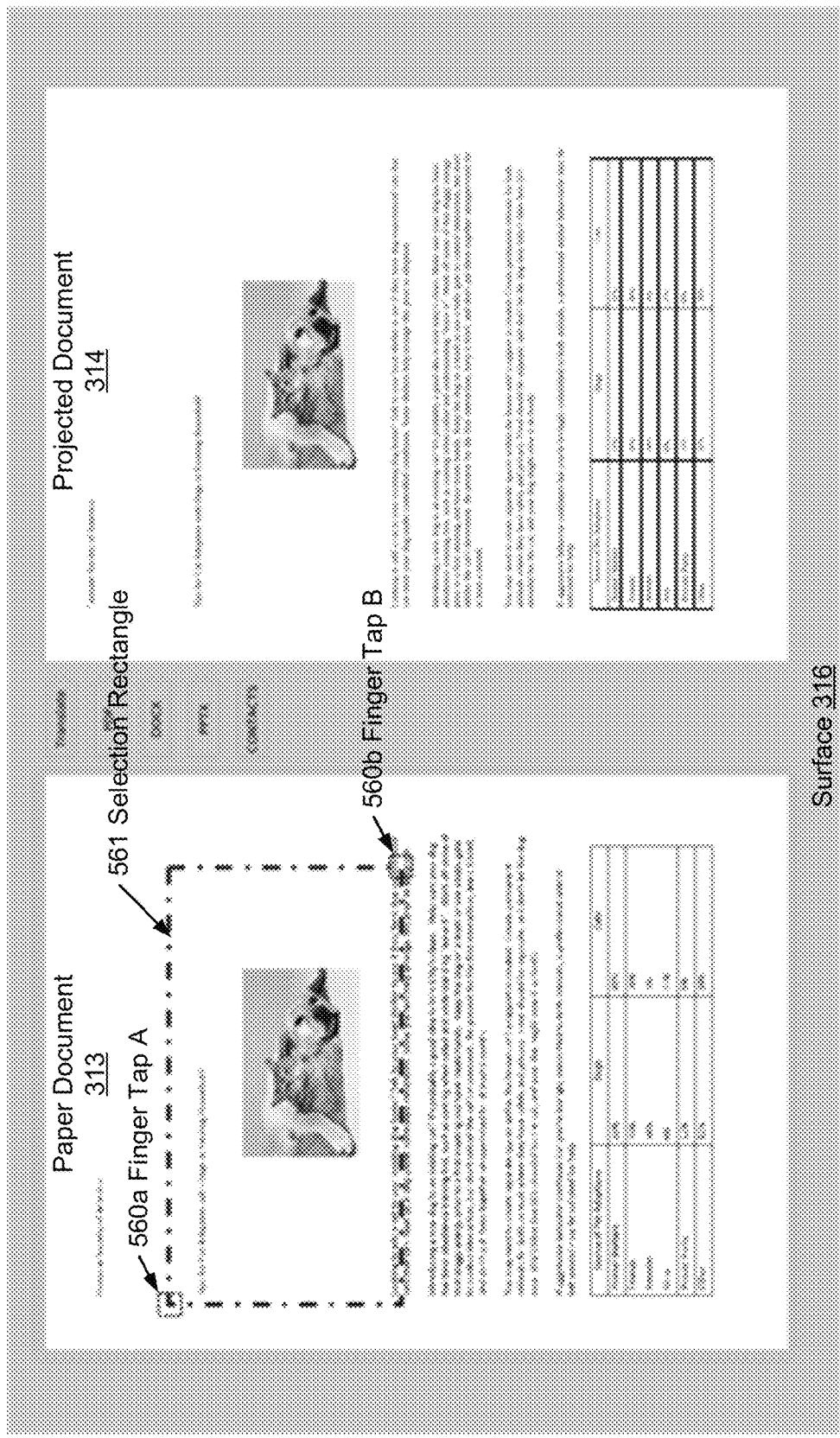
Figure 5G:
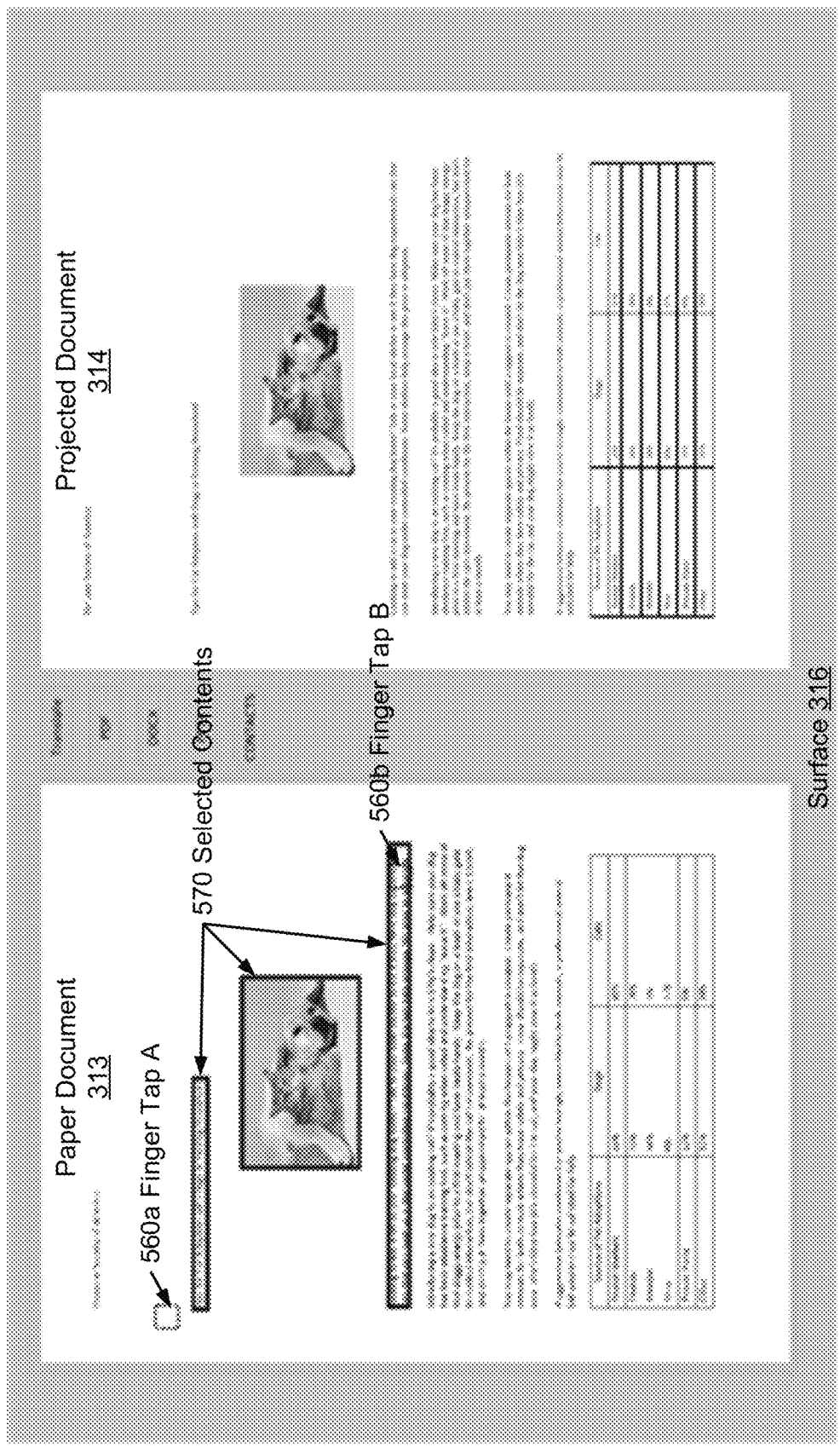

FIGS. 5F-5G shows a multiple-finger-tap gesture selection method. For the multiple-finger-tap gesture selection method, the finger tap window is not used and no selection vector is generated. Instead, the multiple-finger-tap gesture selection method is based on the use of two simultaneous finger taps to define a selection rectangle (561), which is an imaginary box with the upper left corner located at the finger tap A (560a) and the lower right corner located at the finger tap B (560b). The two finger tap positions (i.e., finger tap A (560a) and finger tap B (560b)) are mapped from the projector view to the camera view to search for extracted content blocks in the paper document (313). At the same time, the two finger tap positions in the projector view are used to search for projected content blocks in the projected document (314). In the example shown in FIGS. 5F-5G, the finger tap positions are within the paper document (313).

Once the two finger tap positions are established in the camera view and the projector view, the bounding boxes of all extracted or projected content blocks that intersect with the selection rectangle (561) are identified and added to the current selection. For example, the selected content blocks (570) include an image and two paragraphs as the current selection.

After the user has finished interacting with the paper document (313) and the projected document (314), the set of current selections are highlighted. This is accomplished by transforming any selected bounding boxes in the camera view to the projector view and projecting a rectangle of each selected bounding box onto the surface (316). For each paper-document-based selection, the rectangle is projected on top of the selected bounding box. For each projected-document-based selection, the bounding box is re-rendered to add highlighting. The actual content of the current set of selections is then placed on a clipboard (either the system's clipboard or a cloud-based clipboard). Note that text of the content placed on the clipboard may be a translation of the original text if the user selected translated text in the projected rendering.

Figure 6:
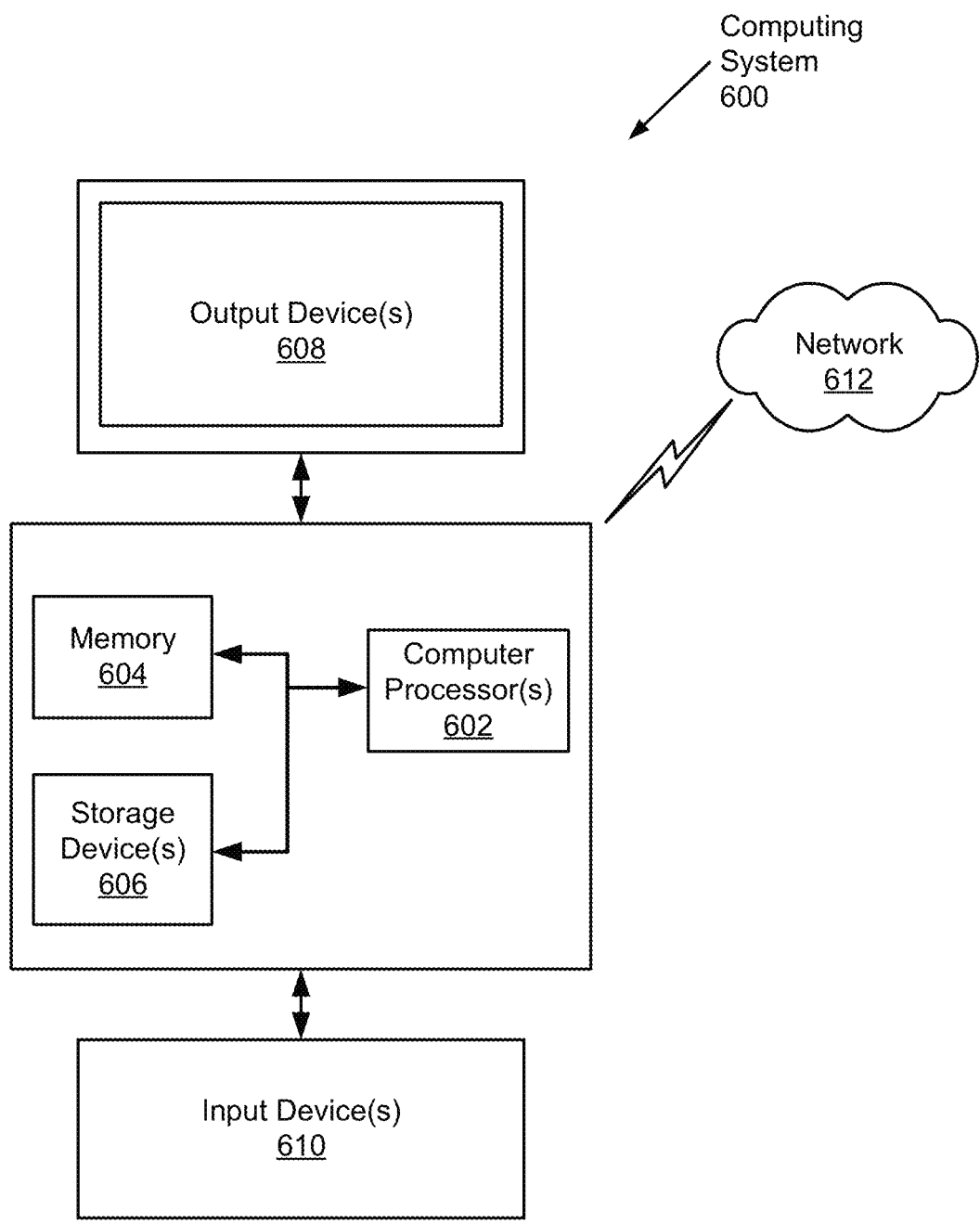
FIG. 6 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the present invention provide the following improvements in electronic document generation and processing technologies: allowing a user to automatically generate an electronic version of a document for which only a physical copy is available, where the electronic version approximates the layout of the physical copy on per paragraph basis; reducing the size of the electronic version by using machine-encoded text to replace image-based content, where corresponding text and image can be cross-referenced based on respective bounding boxes on per paragraph basis; resulting in a compact electronic document that is computer-searchable, where corresponding portion of the physical copy can be highlighted based on the search result; and providing the user a versatile interface whereby the content on the physical copy of the document can be edited in the electronic version or selected into a separate electronic document.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processing method to generate a layout of searchable content from a physical document, the method comprising:

generating, by a computer processor and based on an image of the physical document, a plurality of extracted content blocks in the physical document, wherein the plurality of the extracted content blocks comprises a text block and a non-text block, the text block comprising machine-encoded text to form the searchable content;

generating, by the computer processor and based at least on a first bounding box of the text block, a layout rectangle that identifies where the machine-encoded text is placed in the layout of the searchable content;

generating, by the computer processor and based at least on a second bounding box of the non-text block, an avoidance region that identifies where the machine-encoded text is prohibited in the layout of the searchable content;

generating, by the computer processor and based at least on the layout rectangle and the avoidance region, a draft layout of the searchable content; and iteratively adjusting, by the computer processor and based on a predetermined criterion, a point size of the machine-encoded text in the draft layout to generate the layout of the searchable content.

2. The method of claim 1, further comprising:

generating, by the computer processor, paragraph statistics of the text block, wherein generating the draft layout of the searchable content comprises placing, based on the paragraph statistics, each of a plurality of paragraphs of the text block in reference to the layout rectangle and the avoidance region.

3. The method of claim 1, further comprising:

terminating, by the computer processor and in response to detecting that an adjusted point size causes the draft layout to cross over a border of the layout rectangle, the iteration of adjusting the point size of the draft layout, wherein the draft layout from the immediate previous iteration before the draft layout crosses over the border of the layout rectangle is selected as the layout of the searchable content.

4. The method of claim 1, further comprising:

generating, by the computer processor, a translation of the machine-encoded text from a first language of the physical document to a second language, wherein the first bounding box and the layout rectangle are based on the image of the physical document in the first language, and wherein the draft layout and the layout of the searchable content are based on the second language.

5. The method of claim 4, further comprising:

generating, by the computer processor and based on a search phrase that is in at least one of the first language and the second language, a search result from the physical document.

6. The method of claim 2, further comprising:

generating, by the computer processor, an estimation of a paper size of the physical document, wherein the layout of the searchable content comprises the estimation of the paper size;

generating, by the computer processor and according to the layout of the searchable content, a rendering of the plurality of the extracted content blocks; and projecting, using a projector, the rendering of the plurality of the extracted content blocks onto a workspace surface as a projected document, wherein the layout of the searchable content as projected approximates an original layout of the single page paper document for the text blocks, and wherein the projected document has a dimension that approximates the paper size of the physical document.

7. The method of claim 2, further comprising:

capturing, using a camera, the image of the physical document, wherein the physical document is a single page paper document placed on a workspace surface;

generating, by the computer processor and according to the layout of the searchable content, a rendering of the plurality of the extracted content blocks; and projecting, using a projector, the rendering of the plurality of the extracted content blocks onto the workspace surface as a projected document, wherein generating the rendering of the plurality of the extracted content blocks comprises a transformation between a camera view of the camera and a projector view of the projector, and wherein the layout of the searchable content as projected approximates an original layout of the single page paper document for the text blocks.

8. A system for processing an image to generate a layout of searchable content from a physical document, the system comprising:

a memory; and a computer processor connected to the memory and that:

generates, based on an image of the physical document, a plurality of extracted content blocks in the physical document, wherein the plurality of the extracted content blocks comprises a text block and a non-text block, the text block comprising machine-encoded text to form the searchable content;

generates, based at least on a first bounding box of the text block, a layout rectangle that identifies where the machine-encoded text is placed in the layout of the searchable content;

generates, based at least on a second bounding box of the non-text block, an avoidance region that identifies where the machine-encoded text is prohibited in the layout of the searchable content;

generates, based at least on the layout rectangle and the avoidance region, a draft layout of the searchable content; and iteratively adjusts, based on a predetermined criterion, a point size of the machine-encoded text in the draft layout to generate the layout of the searchable content.

9. The system of claim 8, wherein the computer processor further:

generates paragraph statistics of the text block, wherein generating the draft layout of the searchable content comprises placing, based on the paragraph statistics, each of a plurality of paragraphs of the text block in reference to the layout rectangle and the avoidance region.

10. The system of claim 8, wherein the computer processor further:
   terminates, in response to detecting that an adjusted point size causes the draft layout to cross over a border of the layout rectangle, the iteration of adjusting the point size of the draft layout,
   wherein the draft layout from the immediate previous iteration before the draft layout crosses over the border of the layout rectangle is selected as the layout of the searchable content.

11. The system of claim 8, wherein the computer processor further:
   generates a translation of original content of the machine-encoded text from a first language of the physical document to a second language,
   wherein the first bounding box and the layout rectangle are based on the image of the physical document in the first language, and
   wherein the draft layout and the layout of the searchable content are based on the second language.

12. The system of claim 11, wherein the computer processor further:
   generates, based on a search phrase that is in at least one the first language and the second language, a search result from the physical document.

13. The system of claim 9, further comprising:
   a projector, wherein the computer processor further:
      generates an estimation of a paper size of the physical document, wherein the layout of the searchable content comprises the estimation of the paper size; and
      generates, according to the layout of the searchable content, a rendering of the plurality of the extracted content blocks,
   wherein the projector projects the rendering of the plurality of the extracted content blocks onto a workspace surface as a projected document,
   wherein the layout of the searchable content as projected approximates an original layout of the single page paper document for the text blocks, and
   wherein the projected document has a dimension that approximates the paper size of the physical document.

14. The system of claim 9, wherein
   the computer processor further generates, according to the layout of the searchable content, a rendering of the plurality of the extracted content blocks, and
   the system further comprises:
      a camera that captures the image of the physical document, wherein the physical document is a single page paper document placed on a workspace surface; and
      a projector that projects the rendering of the plurality of the extracted content blocks onto the workspace surface as a projected document,
      wherein generating the rendering of the plurality of the extracted content blocks comprises a transformation between a camera view of the camera and a projector view of the projector, and
      wherein the layout of the searchable content as projected approximates an original layout of the single page paper document for the text blocks.

15. A non-transitory computer readable medium (CRM) storing computer readable program code for processing an image to generate a layout of searchable content from a physical document, wherein the computer readable program code, when executed by a computer, comprises functionality for:
   generating, based on an image of the physical document, a plurality of extracted content blocks in the physical document, wherein the plurality of the extracted content blocks comprises a text block and a non-text block, the text block comprising machine-encoded text to form the searchable content;
   generating, based at least on a first bounding box of the text block, a layout rectangle that identifies where the machine-encoded text is placed in the layout of the searchable content;
   generating, based at least on a second bounding box of the non-text block, an avoidance region that identifies where the machine-encoded text is prohibited in the layout of the searchable content;
   generating, based at least on the layout rectangle and the avoidance region, a draft layout of the searchable content; and
   iteratively adjusting, based on a predetermined criterion, a point size of the machine-encoded text in the draft layout to generate the layout of the searchable content.

16. The non-transitory CRM of claim 15, the computer readable program code, when executed by the computer, further comprising functionality for:
   generating paragraph statistics of the text block,
   wherein generating the draft layout of the searchable content comprises placing, based on the paragraph statistics, each of a plurality of paragraphs of the text block in reference to the layout rectangle and the avoidance region.

17. The non-transitory CRM of claim 15, the computer readable program code, when executed by the computer, further comprising functionality for:
   terminating, in response to detecting that an adjusted point size causes the draft layout to cross over a border of the layout rectangle, the iteration of adjusting the point size of the draft layout,
   wherein the draft layout from the immediate previous iteration before the draft layout crosses over the border of the layout rectangle is selected as the layout of the searchable content.

18. The non-transitory CRM of claim 15, the computer readable program code, when executed by the computer, further comprising functionality for:
   generating a translation of the machine-encoded text from a first language of the physical document to a second language,
   wherein the first bounding box and the layout rectangle are based on the image of the physical document in the first language, and
   wherein the draft layout and the layout of the searchable content are based on the second language.

19. The non-transitory CRM of claim 18, the computer readable program code, when executed by the computer, further comprising functionality for:
   generating, based on a search phrase that is in at least one of the first language and the second language, a search result from the physical document.

20. The non-transitory CRM of claim 16, the computer readable program code, when executed by the computer, further comprising functionality for:
   generating an estimation of a paper size of the physical document, wherein the layout of the searchable content comprises the estimation of the paper size;
   generating, according to the layout of the searchable content, a rendering of the plurality of the extracted content blocks; and projecting, using a projector, the rendering of the plurality of the extracted content blocks onto a workspace surface as a projected document,
wherein the layout of the searchable content as projected approximates an original layout of the single page paper document for the text blocks, and
wherein the projected document has a dimension that approximates the paper size of the physical document.

\* \* \* \* \*